May 22, 1962  W. W. BEMAN  3,035,764
POINT OF SALE RECORDER
Filed May 24, 1955  9 Sheets-Sheet 1
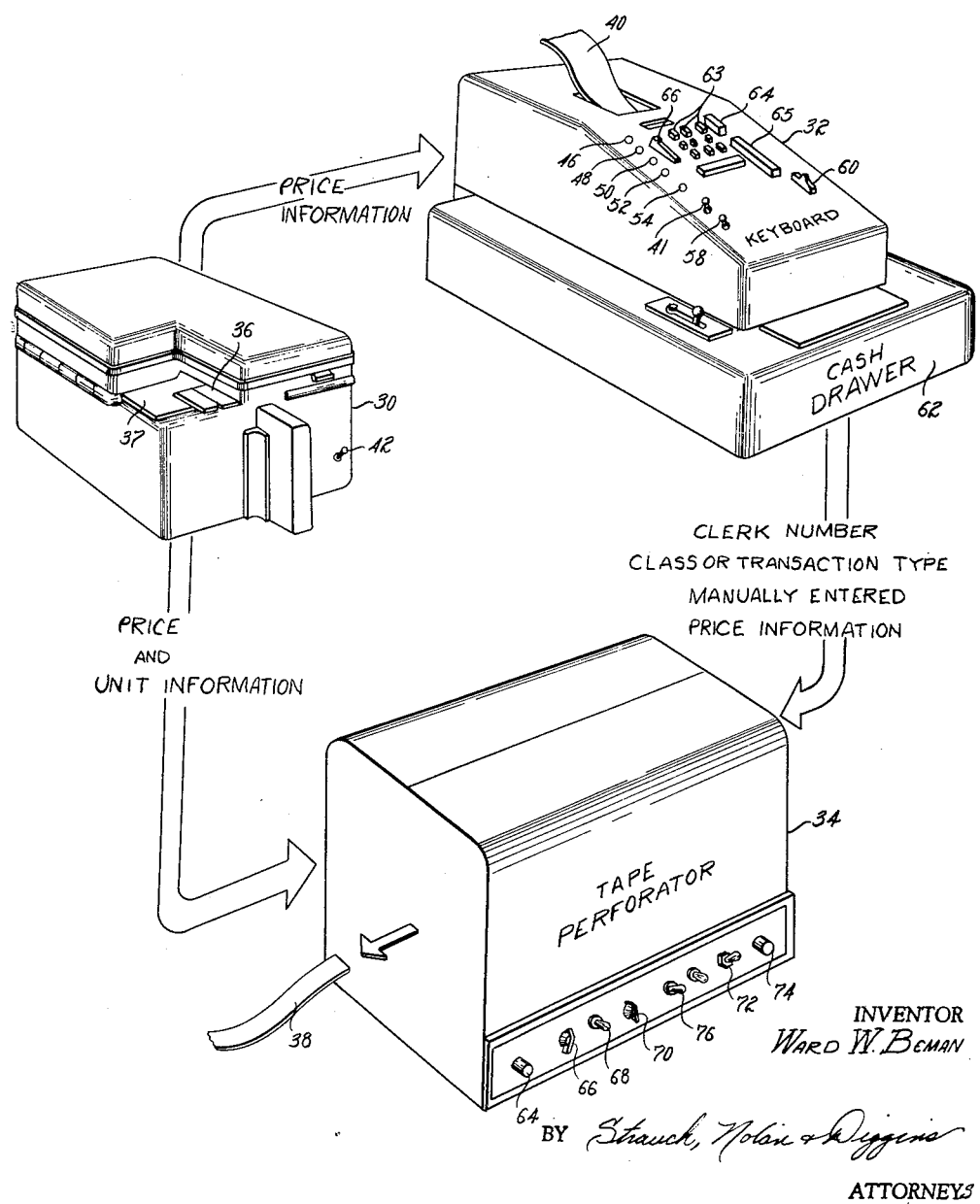

May 22, 1962 W. W. BEMAN 3,035,764
POINT OF SALE RECORDER
Filed May 24, 1955 9 Sheets-Sheet 2
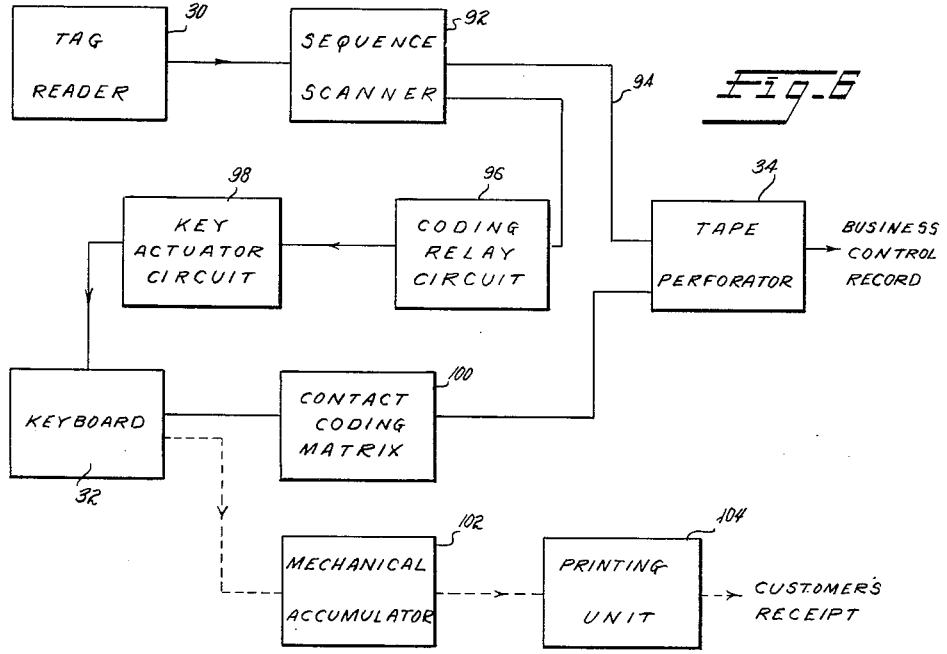
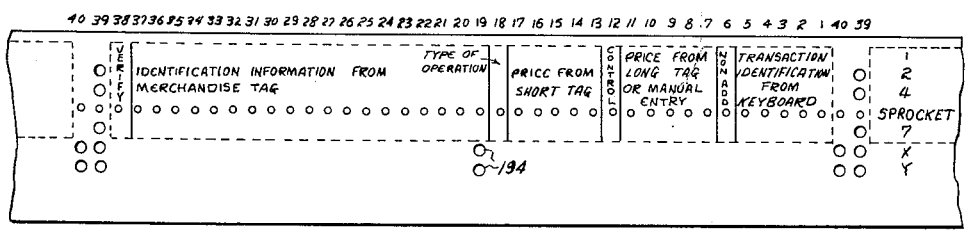
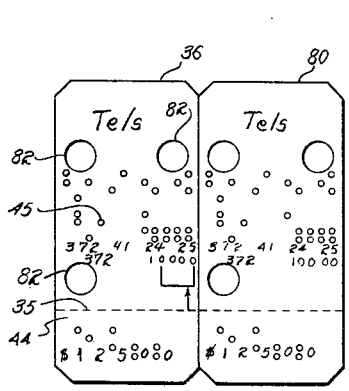
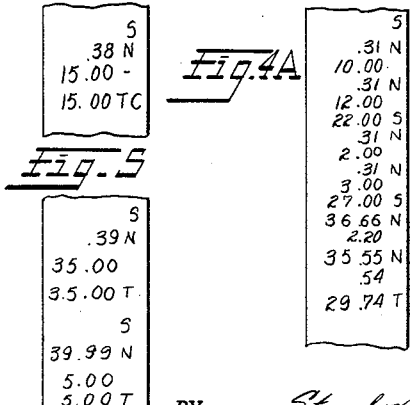
INVENTOR
WARD W. BEMAN
BY
ATTORNEYS May 22, 1962

W. W. BEMAN 3,035,764

POINT OF SALE RECORDER

Filed May 24, 1955

INVENTOR
WARD W. BEMAN

BY *Strauch, Nolan & Diggins*

ATTORNEYS

INVENTOR
WARD W. BEMAN

May 22, 1962 W. W. BEMAN 3,035,764
POINT OF SALE RECORDER
Filed May 24, 1955 9 Sheets-Sheet 5

INVENTOR
WARD W. BEMAN

BY
ATTORNEYS

May 22, 1962 W. W. BEMAN 3,035,764
POINT OF SALE RECORDER
Filed May 24, 1955 9 Sheets-Sheet 7

INVENTOR
WARD W. BEMAN
BY
Strauch, Nolan Diggins
ATTORNEYS

United States Patent Office

3,035,764
Patented May 22, 1962

3,035,764
POINT OF SALE RECORDER
Ward W. Beman, Glendale, Calif., assignor to Telecomputing Corporation, North Hollywood, Calif., a corporation of California
Filed May 24, 1955, Ser. No. 510,750
16 Claims. (Cl. 235—61.9)

This invention relates to an information handling system and more particularly to a method of and apparatus for making records of merchandise or service transactions for use in central data processing centers with flexible control of the recording operation being retained by the sales personnel.

While successful operation of businesses requires that managing personnel be cognizant of both the up-to-date cash balance and stock inventory, it has become increasingly difficult for management personnel in larger businesses to obtain the facts and figures necessary to accurately reflect the current condition of the business.

Prior equipment has provided means for quickly making available information concerning the cash status of the business, but so far no really satisfactory system has been provided for simultaneously providing coordinated inventory information. Central data processing systems using standard tabulation cards are commonly used, but the major problem has been to coordinate changes in the inventory records with actual individual sales. In these systems preparation of tabulating cards from sales receipts involves an operation which has severely limited the effectiveness of the overall operation.

For example, the effect of advertising certain merchandise on the gross sales of the business can easily be ascertained by checking cash receipts. However, whether the advertised merchandise or other merchandise is being sold is unknown without checking the change in inventory. When branch stores are involved, it often occurs that spot shortages of certain articles, sizes or colors occur while this same merchandise is in plentiful supply in other branch stores or is readily available from the manufacturer. By having this information available immediately after the close of the business day proper distribution of merchandise in many instances can be made prior to the beginning of business on the next day. This means fewer sales are lost and the inventory of seasonal goods can be more carefully regulated.

Much effort has been directed toward providing a recording system that would make this much desired information automatically available. Most of these systems have been inadequate because they did not provide the information in the form to which business men are accustomed, thus necessitating revolutionary changes in their accounting system, which in some cases have contributed to business failure. Still other businesses have refused to adopt such systems until they have become more compatible with the existing accounting systems.

Prior systems utilizing merchandise tags and producing records made at the point of the business transaction are disclosed in U.S. Patents Nos. 1,927,556 to Nelson, 2,010,642 to Pierce and 2,155,942 to Brand. The systems disclosed in these patents utilize in all instances the information in the merchandise tags and no provision is made for recording lesser payments than the entire price such as when down payments or layaways transactions occur or when sales inducements are offered by reducing the price below the regular price punched on the merchandise tag. With the advent of sales and excise taxes, additional information must be recorded to produce records satisfactory to the tax collecting agencies of the various governmental bodies involved in this information cannot be readily obtained from known systems.

It is highly desirable that all transactions in a department should be handled by the recording equipment regardless of whether merchandise tags accompany the articles sold. This is also true when merchandise is returned by the customer. The system must therefore be sufficiently flexible to permit a wide latitude of control by the sales clerks and still produce records which will accurately reflect the condition of the business.

The present invention provides equipment incorporating all the above features and basically comprises three units all located at the point of sale thus providing increased reliability of operation and simplicity of installation. The packaging arrangement is such that a minimum of counter space is required and the units which do not require attention by the sales clerk are adapted to be located beneath the counter. This equipment functions to produce all sales registration information which is commonly provided at cash-register stations, along with automatic recording of price, unit control and other information describing the transaction, all of which information is made into a permanent record which in the illustrated example is perforated tape. The system accordingly adapts automation techniques to conform with existing business practices rather than requiring established business customs and practices to undergo major changes to incorporate the point of sale recording equipment of the present invention.

The present invention provides basic advantages in that sales registration operations are made more nearly automatic because information is automatically read from merchandise tags and supplied to the recording element without manual entry, and manual transcription of information in the central accounting department is eliminated because the perforated tape record produced by the recording element is directly usable by conventional data processing equipment. Tape-to-card converters are available which automatically transfer the recorded data onto conventional cards which may then be used to carry out the central data processing and accounting functions in card operated computers, and the tape may be used directly in computers operated by perforated tape.

Basically the system of the present invention includes a merchandise tag reading mechanism and a recorder which normally is expected to record automatically the unit and price information on the merchandise tag. Inventory operations can be carried out as separate operations at desired intervals by these units at which time no operation of the keyboard unit is required. Another basic combination in the overall system is a manually manipulatable keyboard and cash drawer unit connected with the recorder. Information entered in the keyboard is automatically recorded in a form useful in the central data processing equipment and in some types of installations, such as at toll gates and assembly lines, the keyboard and recorder combination are used without the tag reading mechanism. All forms of information handling are accordingly intended to be embraced by the term "business transaction" as used throughout the specification and claims.

The advantages of maximum flexibility of operation are offered with use of both the tag reader and keyboard in combination with the tape perforator as this permits the information supplied by the tag reader to the perforator to be supplemented or even replaced by information entered in the keyboard by the sales clerk. Also a separate printed sales record in the form of a customers receipt is produced in addition to the perforated record used for inventory control and general accounting operations in the overall business accounting system.

The printed sales receipt does not include all the information in the perforated record nor does the perforated record include all the information in the printed sales record. Thus in the illustrated example, the totals from the accumulator associated with the keyboard are not included in the perforated record because totals of sales to each customer are unnecessary in the central accounting office when detailed information of each item sold is provided. However, sub-totals and totals are necessary on the customers printed receipt for the purpose of calculating any excise and sales taxes that may be involved as well as calculating the total amount owed by the customer.

Item identification for each cash entry on the customer's printed receipt is not provided by many businesses in their normal operation and this information is accordingly not printed on the customer's receipt by the equipment of the present invention. Since, however, this information is essential for maintaining an up-to-date inventory it is recorded on the perforated tape. Certain other information such as clerk identification, transaction type, i.e. cash sale, return or layaway, and a class number, i.e. city tax, State tax, Federal tax, pay-out or deposits can be entered in the keyboard at predetermined and appropriate positions in the overall transaction recording sequence and recorded on both the customers receipt and the management control record.

In view of the flexibility of operation of this system, an important feature for assuring satisfactory operation is the series of indicator lights which communicate to the sales clerk when during the recording sequence the various bits of information are to be entered in the keyboard. Special provisions for error correction are also provided which appropriately mark the perforated record to assure that the incorrectly recorded information will not be further processed and for initiating a completion of the recording cycle without further manual entry of data on the keyboard.

Another feature of the present invention is that the equipment is adapted to use either of two sizes of merchandise tags. The long merchandise tag has an extension secured to the short tag form along a perforated line. This extension carries what is ordinarily used as the price information field, while the information field in the main body of the tag contains the item identification information. The information in the main body of the tag may also contain a reduced price so that when a price mark down is desired, removal of the extension is effective to change the coded price information thus eliminating the need for preparing a new merchandise tag.

The tag reader in the present invention includes a sensing switch which internally controls operation of the keyboard and perforator unit to record the information in the tag extension as price when the extension is present and for causing certain information in the main body of the tag to be recorded as price when the tag material has been removed. Additional means are also provided for blocking recordation of any price information on the merchandise tag and for entering the price on the keyboard in the event a still different price is in effect.

Still another major feature of the invention resides in a circuit and switching arrangement for energizing the punch selection coils of the tape perforator. The punch selector coils can be energized either by manual operation of the keys on the keyboard or automatically by the coded information stored on the merchandise tag. When it is desired to print the price information stored on the merchandise tag a unique circuit arrangement is provided for energizing the key solenoids on the keyboard thus effecting operation of the punch selector coils through the key contacts to assure that the information punched in the perforated tape is identical with the information printed on the customer's receipt.

It is a major object of the present invention to provide an improved method of and system for recording all of the factors surrounding a sale or business transaction necessary to provide management with up-to-date information concerning the status of the business.

It is another major object of this invention to provide equipment which will produce the desired information wherein the equipment includes many novel combinations each of which produces functions that are important in various ones of the several modes of operation of the system and are collectively comprised in the overall system as a whole.

It is a further major object of this invention to provide equipment for automatically producing records of each business transaction in a form useful in the central data processing equipment.

It is another object of this invention to provide a system where the information recorded on the merchandise tag is reproduced in a record form that is more suitable for central data processing than the merchandise tag and which has facilities for augmenting or correcting the tag information by entering additional information manually on a keyboard.

Still another object of the invention is to utilize a programmed sequence control selector for operating the recording mechanism in a cyclical pattern and for selectively connecting the tag reader and the keyboard to the recorder in a predetermined sequence.

A further object of the invention is to provide flexibility of operation controllable by the sales clerk so that information concerning a sale may be recorded even though no tag accompanies the merchandise.

Still another object of the invention is to provide flexibility in the control mechanism so that inventory of merchandise identified on tags can be taken with the only manual operation being the act of inserting the tag in the tag reader.

A further object of the invention is to provide equipment for automatically printing information recorded on the merchandise tag on a customer's receipt.

Another object of the invention is to provide flexibility of operation of the equipment so that with use of both long merchandise tags and short merchandise tags the proper field of information is always used for indicating the price of the article.

A further major object of the present invention is to provide a system whereby the usual type of customers receipt is produced and coded data record member suitable for use in central data processing equipment is also provided with no more effort on the part of the sales clerk than is required to produce the usual customers receipt.

Still another object of the invention is to provide the components of this system in a packaging arrangement which permits each user of the equipment to purchase only those components which are useful in his particular type of operation.

A still further object of the invention is to provide a packaging arrangement which permits a reduction of counter space and which eliminates the necessity of long multi-conductor cables extending from each cash-registering position to a central position.

Still another object of this invention is to provide improve means for controlling operation of the program selector control switch to assure reliable operation.

These and other objects of the invention will become more fully apparent from the claims, and from the description as it proceeds in connection with the drawings wherein:

FIGURE 1 is a pictorial view of the units comprising the system with the direction of information flow indicated;

FIGURE 2 is a plan view of a merchandise tag adapted to be read by the tag reader unit;

FIGURE 3 is a view of a block of information on the perforated tape showing in detail where the various bits of information are recorded in each cycle of operation;

FIGURE 4 is a view illustrating a typical sales receipt for a single item;

FIGURE 4a is a similar view of a sales receipt showing a multiple item sale with Federal and State sales tax included;

FIGURE 5 is a view of a sales receipt produced when an item is returned;

FIGURE 5a is a view of a sales receipt produced during recordation of a layaway transaction;

FIGURE 6 is a functional block diagram of the system;

Figure 7:
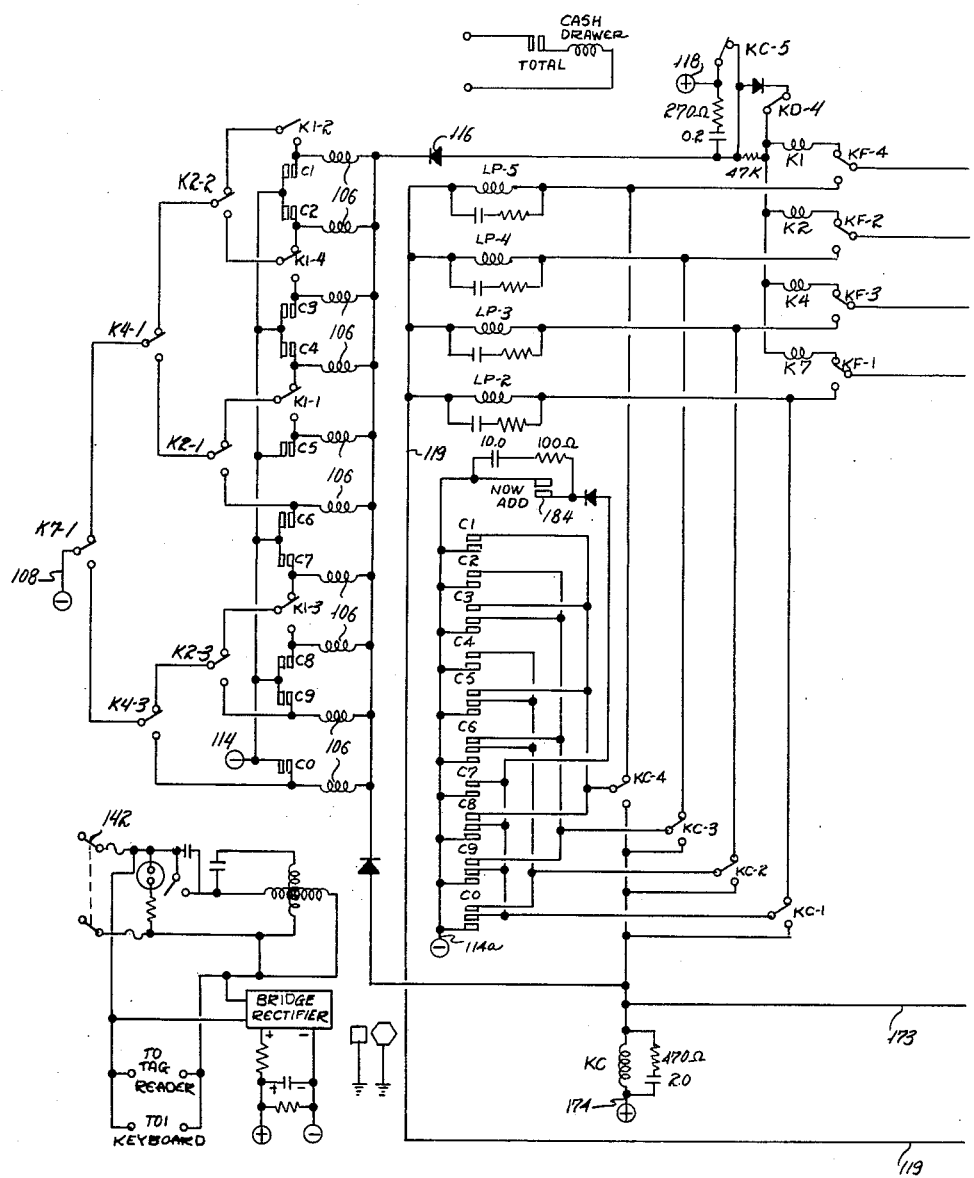
Figure 8:
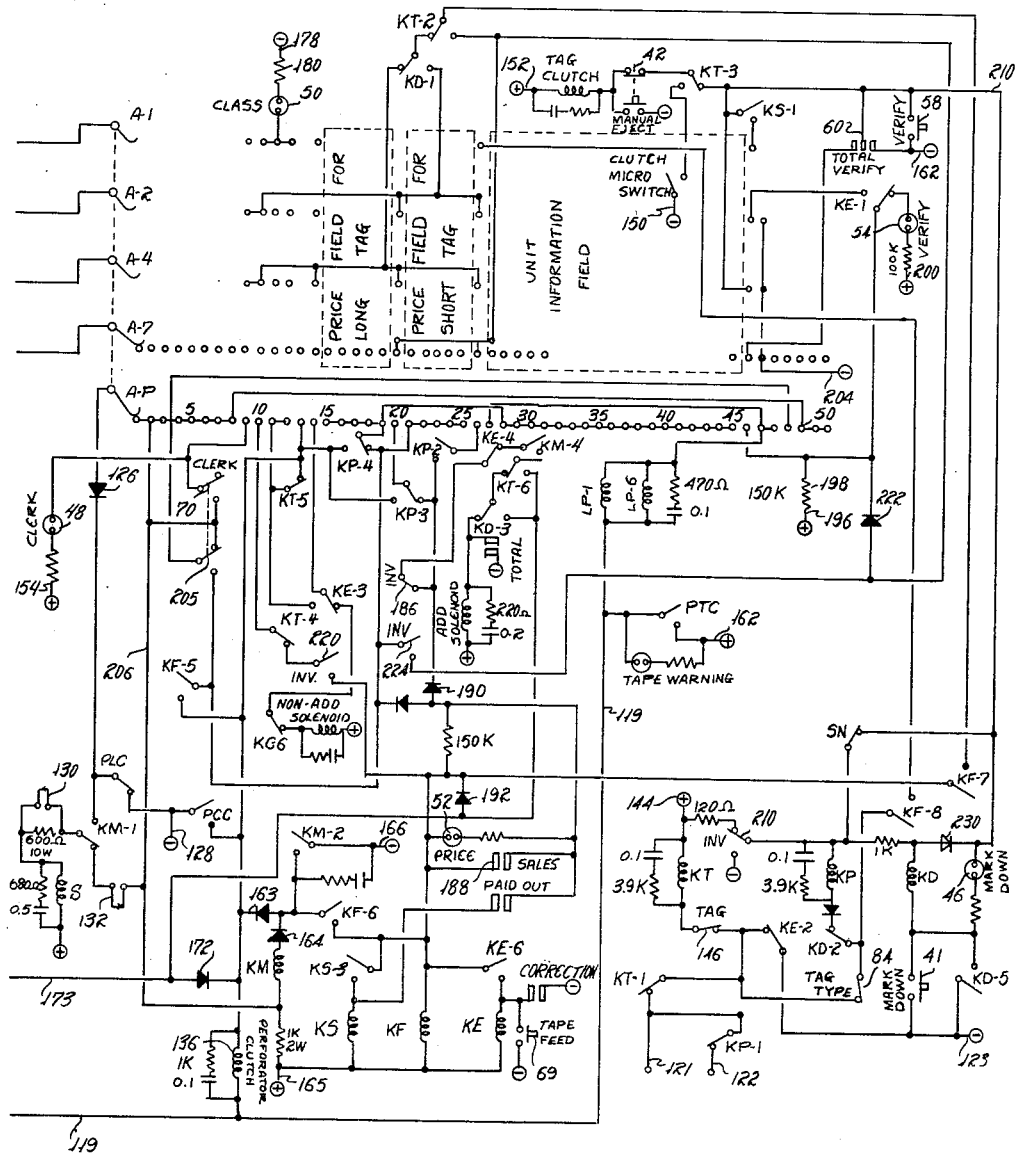
Figure 9:
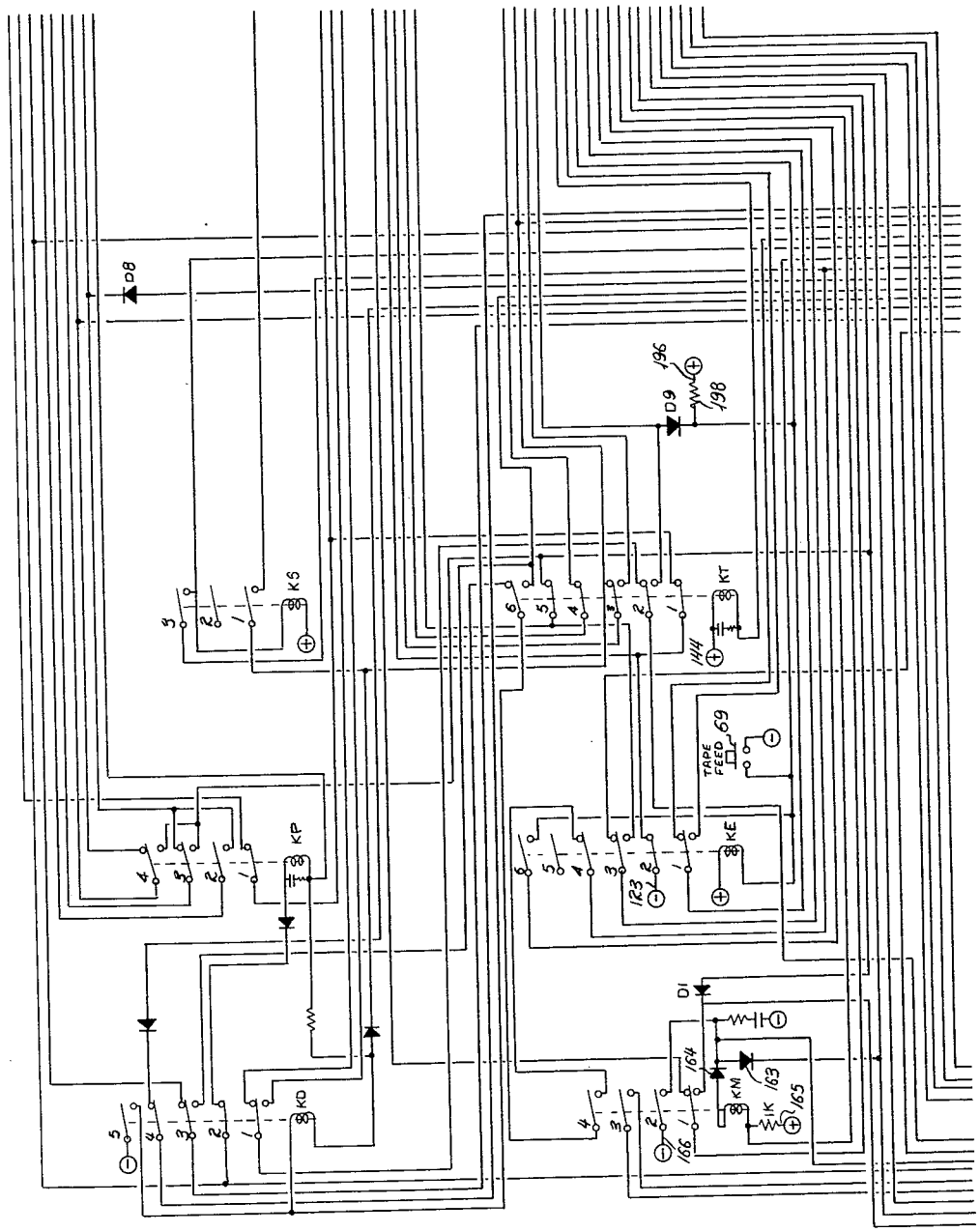
Figure 10:
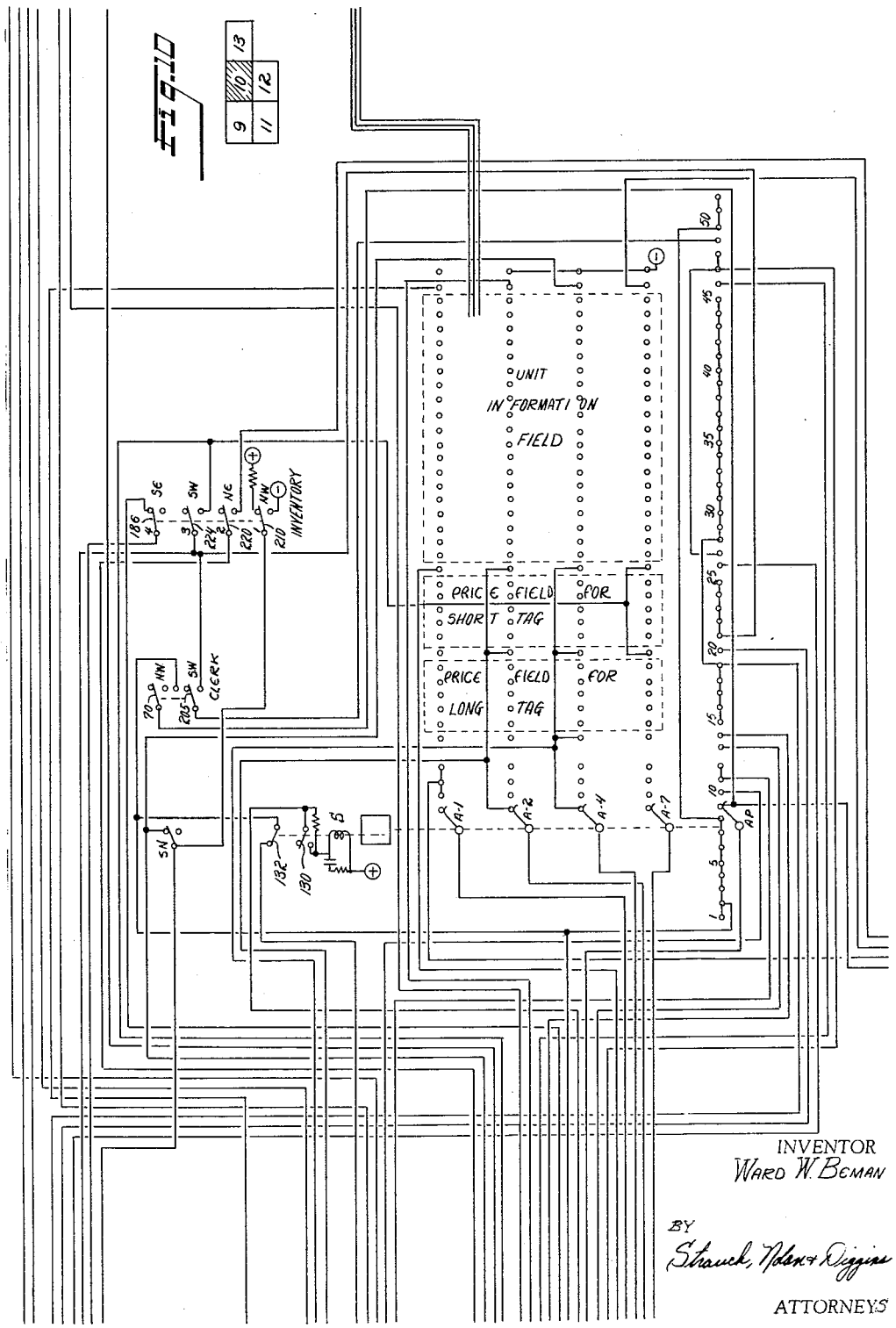
Figure 11:
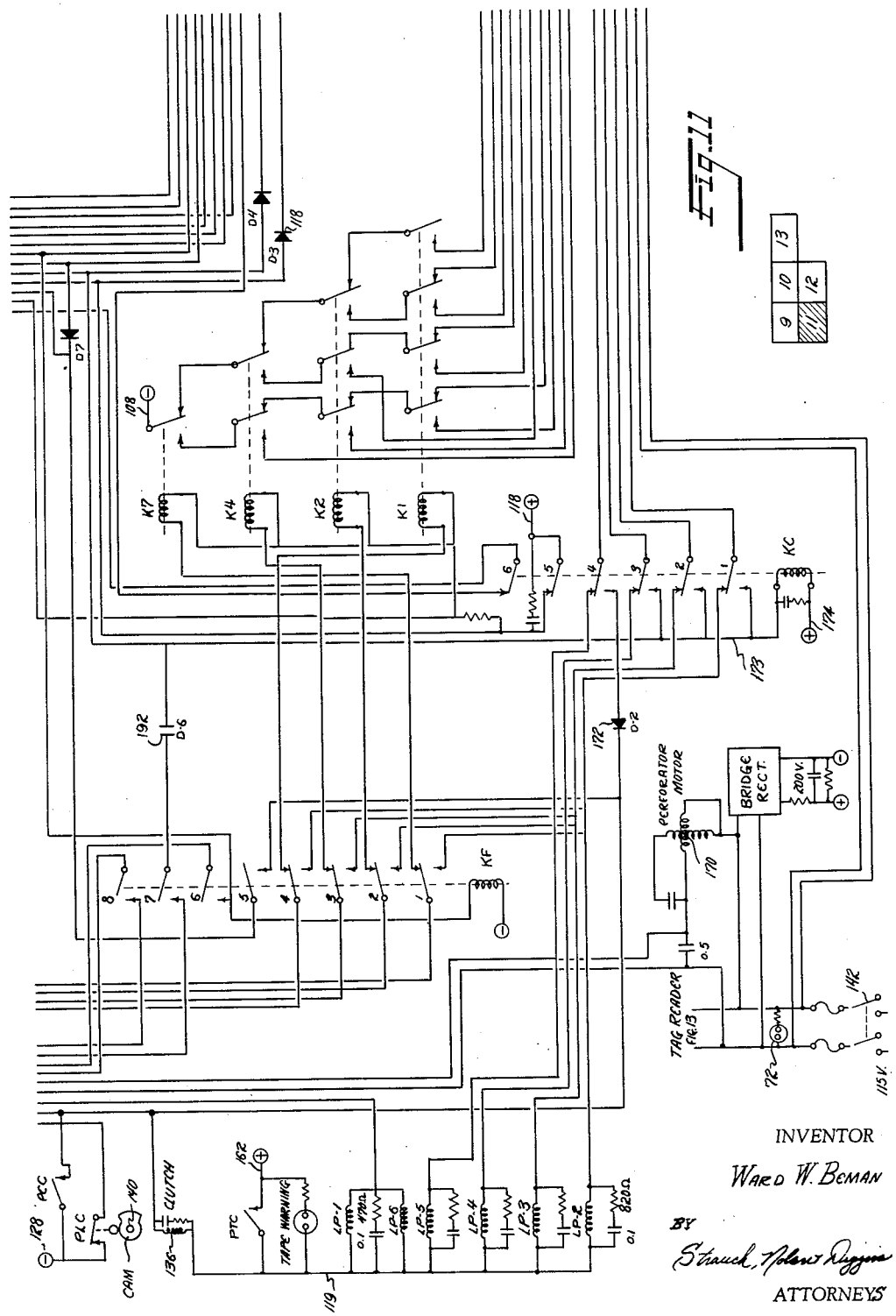
Figure 12:
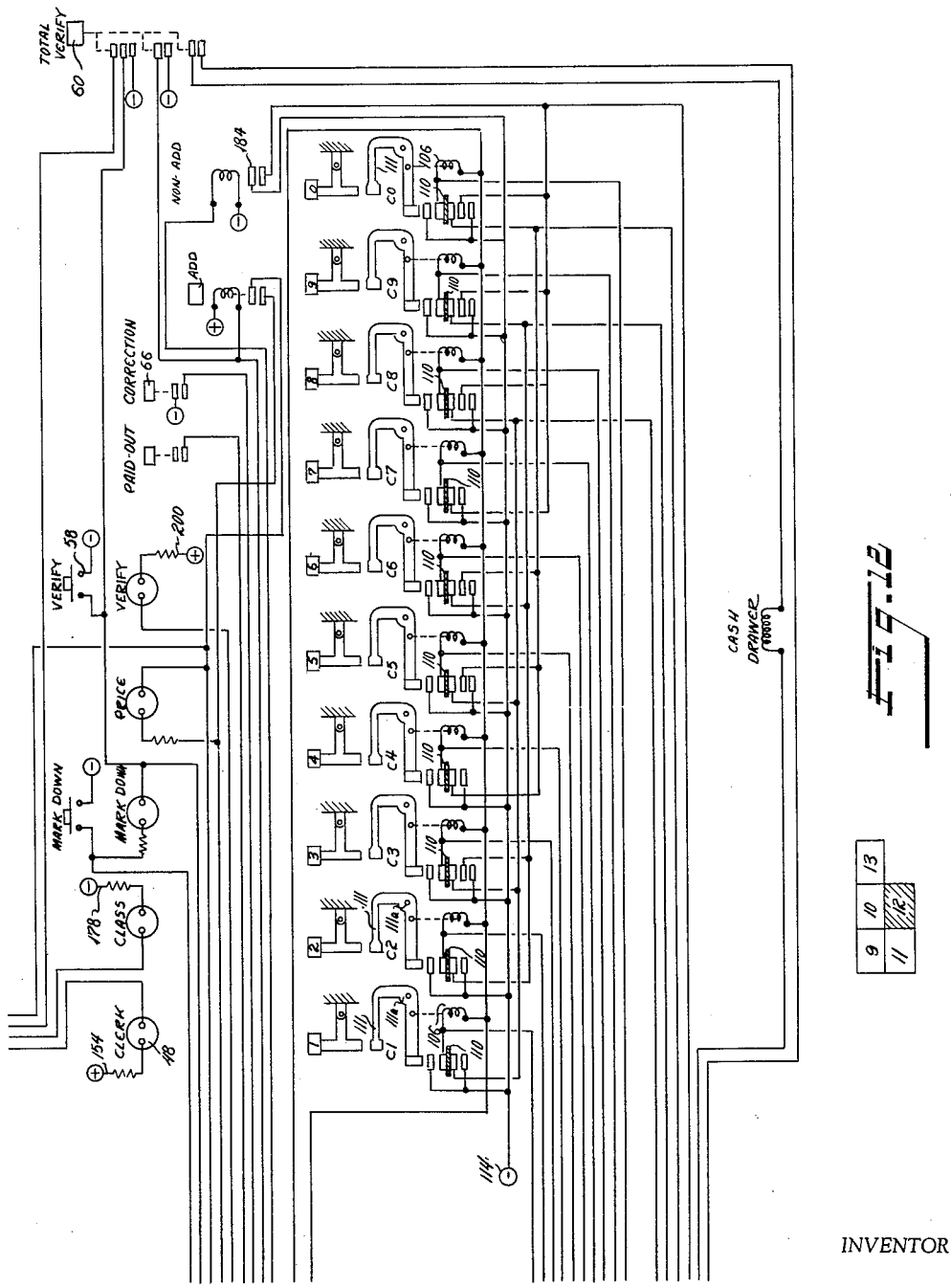
Figure 13:
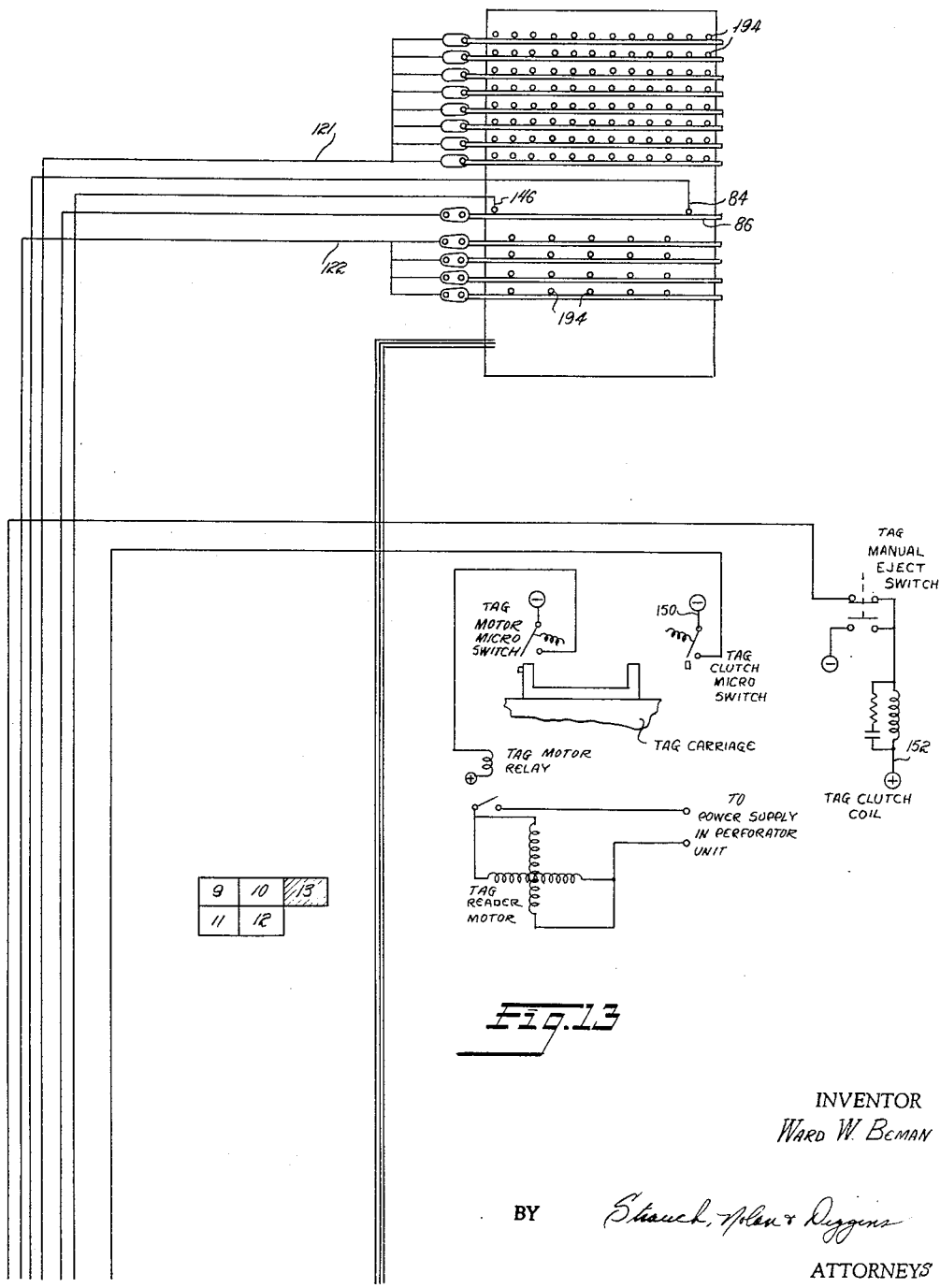

FIGURES 7 and 8 together comprise a complete schematic diagram of the electrical circuit in the system; and FIGURES 9 through 13 comprise a complete detailed circuit diagram of the wiring of the electrical system with the electrical elements in the tag reader being located in FIGURE 13, the electrical elements in the keyboard being generally located in FIGURE 12 unit and the remaining elements located mainly in the tape perforator unit.

The point of sale recording system according to the present invention basically consists of a tag reader 30 comprises a keyboard and cash drawer unit 32 which is modified by adding internally to the conventional construction certain solenoids and key contacts as illustrated in FIGURE 12, and a tape perforator 34. The overall purpose of the apparatus shown in FIGURE 1 is to convert information appearing in the form of perforations in merchandise tags as illustrated in FIGURE 2 into coded registrations on a record for use in central data processing procedures. The coded registrations in the illustrated example are in the form of perforated paper tape as shown in FIGURE 3 though many of the basic features and novel concepts of the present invention could equally well be utilized with other forms of digital coding such as perforated cards, magnetic tape, magnetic printing on cards or other equivalent types of records.

A printed paper record in the form of a sales receipt as illustrated in FIGURES 4 and 5 is also simultaneously produced during the time of the recording on the perforated tape.

Basically the function of tag reader 30 is to sense the information in coded form on the merchandise tags and to make this information available for transfer to the tape perforator 34 and keyboard 32 as desired. The merchandise tags may either be a long type as shown in FIGURE 2 or a short type which does not have the section below the perforated line 35. In either case the coded information generally includes item identification for inventory control purposes and price information.

GENERAL OPERATION

In operation, the perforated merchandise tag 36 of FIGURE 2 is placed on the carriage 37 of tag reader 30 and the carriage is pushed in manually. In normal operation the clerk then enters on the keyboard a clerk identification digit and a transaction type identification number. This information plus all the coded information is transferred to the perforated tape 38. The information manually entered on the keyboard and price information from the tags are printed on the customer's sales receipt 40. A push button control 41 on the face of keyboard 32 is effective to block transfer of price information from the perforated merchandise tag to permit a different sales price to be entered on the keyboard which is printed on the paper tape 40 and also punched in the perforated tape. The paper tape 40 may be printed in duplicate or triplicate as desired.

At the end of each cycle of operation the merchandise tag is ejected automatically unless the correction key 66 on the keyboard has been pushed. Ejection can also be performed manually by pushing tag ejection button 42 on tag reader 30.

The tag reader senses whether the lower section 44 below perforated line 35 on the merchandise tag is present by means of a switch which is opened by the presence of tag material in the lower field position 44. In the long tag where this material is present, there are two information fields. Upper field 45 consists of twenty-four digits and lower field 44 consists of five digits. The code system illustrated is a four channel binary decimal and is the same code used on the perforated tape as described below.

The lower field 44 normally carries the price information while the upper field carries item identification information. When the lower field is removed along perforated line 35, the tag is then referred to as a short tag. The equipment of the illustrated embodiment is so arranged that when a short tag is used, price information is contained in the last five digits of the twenty-four digit information field 45. By sensing the type of tag being read, the equipment determines which information is to be supplied to the keyboard to be printed as price information.

Keyboard unit 32 is a modified form of a known type of adding machine cash drawer combination and contains almost all of the buttons, keys and lights used to perform the manual entry of control and numerical information to the point of sale recording system. Information which varies with successive sales is entered manually on the keyboard and consists of a clerk number and a class number or transaction type number depending upon the nature of the transaction and whether a merchandise tag accompanies the transaction.

In the illustrated embodiment the first number recorded consists of a single digit indicating the clerk number. The next number, if a single digit, indicates a tag accompanies the transaction and the value of the digit is coded to indicate the transaction type, that is whether it is a cash sale, return, or layaway. When no tag is being read, the second number consists of three digits to indicate the class of transaction, that is whether it is city tax, Federal tax, payout or deposit. The clerk number and transaction type or class number entered on the keyboard are printed on the customer's receipt 40 as a non-add function and are also punched in the perforated tape 38.

Next the price information is recorded on both the customer's receipt 40 and the perforated tape 38 and comes normally from the coded data on the tag, though as mentioned above and as will be explained in detail below, price may be entered on the keyboard. Finally the item identification from the tag is punched on the tape and then the numerical values of the subtotals and totals obtained from the accumulator in the keyboard are printed only on the customer's receipt 40 and are not punched in the perforated tape 38 as is apparent from the block diagram in FIGURE 6.

The keyboard control panel shown in FIGURE 1 has five lights to communicate to the sales clerk the nature of the information to be entered at each step requiring manual operation. These lights are identified as markdown 46, clerk 48, class 50, price 52 and verify 54.

The markdown light 46 indicates that the operation requires manual price entry rather than using price information in the tag or that the transaction is not accompanied by a merchandise tag. This light is illuminated by closure of markdown push button switch 41 which is used either when the sales price is different from the price recorded on the merchandise tag or when the transaction is not accompanied by a merchandise tag. Each of the other lights comes on automatically at predetermined intervals in the recording cycle to indicate to the operator that he must perform at that time the operation identified.

Pushing verify button 58 causes punching of a special digital indication on the perforated tape indicating whether the transaction is a "sale" or "paid out" operation.

Pressing the subtotal key 59 on the keyboard only causes the accumulator sub-total to be printed on paper tape 40 and does not otherwise affect the system.

Closure of the total-verify key 60 performs the same operation caused by verify button 58, and in addition, the accumulator total is printed on the customer's receipt, resets the accumulator to zero and opens cash drawer 62. Other controls on the keyboard include the usual number keys 63, the subtract key 64, the motor bar 65 and a special correction key 66. The subtract key 64 has a pair of contacts which energize a special subtract relay in the system to cause a hole to be punched in a special subtract designating position in the tape. The correction key 66, in addition to correcting the keyboard, causes the perforator to complete its cycle of operation.

The tape perforator unit 34 receives information from both tag reader 30 and keyboard 32 and is operated in a cyclical manner by a sequence scanner or distributing means which in the illustrated embodiment is a stepper switch. The sequence scanner causes information to be punched into the paper tape 38 in blocks or repetitive patterns. An example of an information block on the paper tape is shown in FIGURE 3 and each block contains all of the information required concerning each individual cash entry for proper control of the various accounting operations in a central accounting station.

The perforated tape 38 may be removed from the perforator unit at desired intervals for processing by the central data processing equipment and inserted directly into a tape-controlled business computer or automatically converted to punched cards for use in standard punched card accounting machines. It is adaptable to automatic transmission by commercial wire services to a remotely located accounting operation as explained in application Serial No. 478,247, now abandoned, filed December 29, 1954 by Wyche D. Caldwell and assigned to the assignee of the present invention. A standard one inch paper tape roll will store information concerning about three thousand operations.

The tape perforator control panel includes only controls which need to be operated at the beginning and end of the day or when special operations are being performed such as taking inventory or removing the tape from the unit.

Tape supply light 67, normally turned off, becomes energized just before the end of the tape is reached. As will become apparent from the following explanation, energization of tape supply light 67 will stop all operations of the equipment.

"Inventory-sales" switch 68 is a two position switch manually set depending on whether the system is to perform inventory or sales operations.

Feed button 69 causes the tape to advance through one cycle of operation. An error symbol is automatically printed since this switch is in parallel with correction key 66 on the keyboard as is clearly shown in FIGURE 8.

Clerk switch 70 is a two position switch which is manually set depending whether the equipment is to record a clerk designating digit.

Power switch 72 is merely an on-off switch and is accompanied by a pilot light 74. Fuse cartridges 76 are also shown on the control panel.

MERCHANDISE TAG

The merchandise tag as illustrated in FIGURE 2 commonly comprises two or more identical sections 36 and 80. Since the tag reader is operated by only one single section, the presence of additional sections is immaterial insofar as the present invention is concerned. Each tag section 36 or 80, hereinafter referred to as just the merchandise tag, includes three holes 82 for accurately positioning the tag on the tag reading carriage so that the main information field 45 and the price information field 44 will be properly aligned with feeler pins in the tag reader.

Preparation of the tags is generally completed when the merchandise is placed on the sales floor. Satisfactory equipment for preparing these merchandise tags is well known and accordingly is not part of the present invention.

The upper information field 45 contains eight positions in the vertical direction and twelve positions in a horizontal direction. The lower information field 44 contains four vertical positions and five horizontal positions. Lower field positions 44 normally carry the regular item price while upper field 45 is encoded with item identification information which is intended to carry the information necessary for proper inventory control. The printed numbers are applied during preparation of the tag and may correspond with the information punched in the tag.

In certain merchandising operations the lower portion 44 of the tag is removed prior to sale of the merchandise. Under these circumstances the last five positions in the upper information field 45 are used to store the price information thus leaving 19 digital positions for encoding the item identification information.

The tag reading mechanism is schematically illustrated in FIGURE 13, carries a feeler pin 84 for detecting the presence or absence of the lower section 44 of the merchandise tag. When feeler pin 84 projects against bus bar 86 a control relay internally transfers certain electrical circuit connections so that the coded information in the last five positions of upper field 45 is printed on the customer's receipt by the printing mechanism on keyboard 32 as price information. When the entire tag is in the tag reader feeler pin 84 is insulated from bus bar 86 and the price information from field 44 is printed on the customer's receipt.

This feature is particularly useful in businesses selling seasonable items such as ready-to-wear clothes. In these businesses it is expected that price reductions will be necessary to reduce inventory near the close of the season. Accordingly, the regular price is printed in the lower information field while the anticipated reduced price is printed in the upper information field when the tag is initially prepared. To put the lower prices in effect, it is only necessary to remove sections 44 along perforated line 35 from the tags accompanying the merchandise on the floor thus making it unnecessary to prepare a new merchandise tag to still retain the inventory control information benefits of tag operation.

In businesses where price reductions are not anticipated or where a price change is in effect which is other than that anticipated, the sales clerk is able to block transfer of price information from either type of tag by closing markdown switch 41 on the keyboard. This energizes a relay which transfers the electrical circuits to cause the tag reading operation to stop when price information is to be recorded and to energize price light 52 on the keyboard at which time the clerk then manually enters the price on keys 63. The price information is printed on the customer's receipt and punched in the perforated tape and the tag reader then completes its reading operation of the item identification information in the usual manner.

PERFORATED TAPE

A paper tape, as illustrated in FIGURE 3, is used to record information by means of various coded perforations arranged in vertical columns. An 8 hole tape one inch wide is employed, but only 6 holes are utilized.

A series of sprocket holes consisting of a single hole punched during each perforating cycle are engaged by a driving gear to advance the tape through the tape perforator 34. The sprocket holes separate the width of the tape into a top and bottom area. Each area has three channels extending horizontally in which coded information may be perforated into the tape.

The code system used is a 1–2–4–7 system of binary coded decimal notation. By adopting this system, only two binary digits, rather than three, are needed to represent any decimal digit from 0 to 9. Four information channels are provided on the tape and may be labeled, for illustrative purposes, $a$, $b$, $c$, $d$. If a binary "1" is to be registered, a punched hole will appear and if a binary "0" is registered, a hole will not appear. Therefore, the following Table I illustrates how the binary coded decimal digits are represented:

Table I

| Decimal digit | Tape code | Binary code 7421 |
|---|---|---|
| 1 | a | 0001 |
| 2 | b | 0010 |
| 3 | ab | 0011 |
| 4 | c | 0100 |
| 5 | ac | 0101 |
| 6 | bc | 0110 |
| 7 | d | 1000 |
| 8 | ad | 1001 |
| 9 | bd | 1010 |
| 0 | cd | 1100 |

Inasmuch as the "cd" combination actually equals decimal digit 11, its value has arbitrarily been assigned as "0" as this is the only remaining combination of two binary digits equal to "1." The two remaining channels on the tape are labeled X and Y and are used to indicate the end of a "block" of information and to insure that the tape is properly aligned when the tape is passed eventually through a tape reading mechanism (not shown).

A block of information as illustrated in FIGURE 3 comprises forty vertical columns on the tape. Each column contains binarily coded decimal digits representing clerk, transaction type and price information, and item identification information on recording operations accompanied by a merchandise tag.

The following table in connection with FIGURE 3 illustrates in detail the location of the various items of information on the tape.

5 and 5a is printed by the conventional mechanism in the adding machine part of keyboard 32. The type of receipt shown in FIGURE 4 is examplary of a single unit sale with no tax.

Each customer transaction should be initiated by depressing motor bar 65 to print out on the customer's receipt the total in the accumulator which is followed by an S indicating that the accumulator is clear. This operation is optional and does not affect the remainder of the equipment. Each clerk using a particular keyboard unit is assigned a special number and throughout the explanation in the specification, the clerk number used in the illustrated embodiment will be the digit 3.

When a merchandise tag accompanies the transaction, the transaction type consists of a single digit and the following code will be used.

| Code: | Transaction type number |
|---|---|
| 1 | Cash sale |
| 8 | Return |
| 9 | Layaway |

When the transaction is not accompanied by a merchandise tag, or when the transaction even though accompanied by a merchandise tag includes a cash entry not identified by a merchandise tag, the following coded group of three digits will be used.

| Code: | Class number |
|---|---|
| 555 | City tax |
| 666 | Federal tax |
| 888 | Pay-out |
| 999 | Deposit |

Table II

| Stepper switch contacts | Tape column | Item | Tape punches |
|---|---|---|---|
| 9 | 1 | Clerk | Coded decimal when clerk switch 70 on perforator panel is in "clerk" position. Blank when clerk switch is in other position. |
| 10 | 2 | Transaction | Coded decimal when either class number or transaction type is entered on keyboard. |
| 11 | 3 | ---do--- | Blank when class number is entered; coded decimal representing second and third digits in tape columns 3 and 4 respectively of transaction type number. |
| 12 | 4 | | |
| 13 | 5 | Blank | |
| 14 | 6 | Non-add | Always punches number 7 punch. |
| 15 | 7 | Price information on long tag or keyboard operation | Coded decimal for long tag operation or manual price entry. Blank during short tag operation. |
| 16 | 8 | | |
| 17 | 9 | | |
| 18 | 10 | | |
| 19 | 11 | | |
| 20 | 12 | Control | 2, 4, or 7 or blank. |
| 21 | 13 | Price information on short tag | Coded decimal of information in last five positions in upper field 45. |
| 22 | 14 | | |
| 23 | 15 | | |
| 24 | 16 | | |
| 25 | 17 | | |
| 26 | 18 | Type or operation | Coded Decimal:<br>Manual price entry 1, 7.<br>Long tag sales 4.<br>— Markdown 2.<br>— Inventory 4, 7.<br>Short tag sales 1, 4.<br>— Markdown 1, 2.<br>— Inventory 1, 4, 7. |
| 27 thru 45 | 19 thru 37 | Unit control digits 1-19 | Coded decimal of information in first 19 positions in upper information field. Column 19 also contains X and Y punches. |
| 46 | 38 | Verify | Coded decimal:<br>                                    Verify   Total verify<br>Sale                                   4        4, 7<br>Paid out                             1, 4    1, 4, 7<br>Error                                    2         2 |
| 47 | 39 | Registration | Coded Decimal 2, 4, 7 plus X and Y. |
| 48 | 40 | Tape mark | X and Y tape orientation marker. |
| 49 thru 52 | None | | |
| 1 thru 8 | None | | |

The stepper switch positions in the above table correspond with the numbered stepper switch contact terminals shown in FIGURES 8 and 10. A detailed discussion of the operation of the stepper switch is included in connection with the discussion of the operation of the detailed circuit diagram.

CUSTOMER'S RECEIPT

The customer's receipe illustrated in FIGURES 4, 4a, 5 and 5a is printed by the conventional mechanism in the adding machine part of keyboard 32. The type of receipt shown in FIGURE 4 is examplary of a single unit sale with no tax.

The customer's receipt in FIGURE 4 includes first an S which indicates the accumulator is clear. Next the digit 3 is entered to identify the clerk. Since a tag accompanies this operation and the operation is assumed to be a cash sale, the digit 1 is entered in the accumulator. Automatic operation then begins and the non-add solenoid in the keyboard is energized to cause printing of the digits 3 and 1 and the letter N on the customer's receipt. Assuming no price mark-down, the price will be automatically entered from information stored on the merchandise tag, the add solenoid will be energized to cause the price to be printed on the customer's receipt and the equipment will automatically continue through the cycle and stop just before the end of the cycle.

At this time, verify light 54 on the keyboard is illuminated and the clerk has an opportunity to compare the price recorded on the customer's receipt with the price of the merchandise and check the correctness of the other numbers on the receipt. If everything is satisfactory and the complete customer transaction comprises only the single item, the clerk closes totalizing key 60 thus causing the recording cycle to complete by printing the total from the accumulator on the customer's receipt and opening the cash drawer. If there has been an error the clerk closses correction key 66 to initiate a complete new operation. A correction mark is made on the perforated tape and the tag is not ejected, but is ready for the entire recording sequence to start again.

The receipt shown in FIGURE 4a is for a multiple sale comprising four items, only two of which are subject to Federal excise tax and all four being subject to a 2% State sales tax. The first item is a ten dollar sale accompanied by a merchandise tag sold by clerk 3. After entry of the digits 3 and 1 operation is automatic until the verify light comes on near the end of the recording cycle. The clerk then merely observes the printed receipt and after seeing that the entry is correct presses verify button 58. The tag reader then ejects the merchandise tag and the tape performator completes its cycle of operation. The second tag which comprises a twelve dollar sale is then inserted in the tag reader. The clerk identifies himself by pressing key 3 on the keyboard, then pressing key 1 indicating a sale, and automatic operation continues printing the twelve dollar price and stopping just before the cycle is completed by turning on the verify light 54. The clerk is now interested in a sub-total since Federal tax will be based on the sub-total of these two items. Closing the sub-total key and verify button 58 causes the printing mechanism to print the sub-total of twenty-two dollars and this cycle of operation to complete and eject the merchandise tag from the tag reader.

The merchandise tag for the third item is then inserted in the tag reader followed by entering the clerk identification number and the transaction type number on the keyboard. Operation automatically prints the two dollar price, records the item identification information in the perforated tape and then turns on the verify light. After the verify button is pushed and the tag ejected, the fourth merchandise tag is inserted and the same sequence followed up to the time the vertify light is turned on. At this point another sub-total is taken by depressing the subtotal key and verify button 58 as this is the price base on which the State sales tax is calculated.

The next operation is a "no tag" operation which is started by pressing the clerk identification number on a keyboard followed by the three digit class number identifying Federal sales tax. The non-add coil is automatically energized by the stepper switch and the sequence of operation stops at the point where the amount of tax is ready to be entered in the keyboard. This is indicated by illumination of price light 52 on the keyboard.

The clerk then mentally calculates 10% of $22.00 and enters $2.20 on the keyboard. Automatic operation then takes over and continues down to the point where the verify light 54 turns on. During this part of the cycle no information is recorded in the tape perforator corresponding to item identification since no tag is in the tag reader. If the entry is correct, depressing verify key 58 then completes the cycle and the clerk is ready to enter the State sales tax. This is a separate operation again initiated by the clerk number followed by the three digit number identifying State sales tax. The non-add solenoid is automatically energized thus causing the number 3555 to be printed on the customer's receipt and automatic operation stops with the illumination of price light 52. The State sales tax on $27.00 is then mentally calculated and entered on the keyboard, and automatic operation continues until verify light 54 is illuminated. Since this is the end of the transaction the clerk presses totalizing key 60 and the total from the accumulator is printed on the customer's sales receipt, and the cash drawer opens. The total from the accumulator is not punched in the perforated tape as the record of each individual cash entry is adequate for central accounting operation.

If the customer returns an item accompanied by a merchandise tag, the receipt shown in FIGURE 5 is produced while the clerk records the cash refund in the following manner. Markdown push button 41 on the keyboard is depressed as the price must be entered manually to identify on the perforated tape and sales receipt that it is an amount being paid out. After checking to assure the accumulator is clear, the clerk inserts the merchandise tag in the tag reader, enters his identification number of 3 and then follows with the transaction identification digit 8 indicating a return transaction. Operation continues automatically to the point where price information is required. The price is manually entered and followed by depression of subtract key 64 which causes a minus sign to be printed on the sales receipt and automatic operation continues until verifier light 54 is illuminated. Operation of totalizing key 60 then effects the final printing operation on the cashier's receipt and along with a special designation such as TC signifying a negative total.

If returned merchandise is not accompanied by a merchandise tag or the transaction is merely a cash pay-out, the clerk enters the clerk identification digit followed by the "pay-out" class number 888. Then after the price light is illuminated, the amount of cash being paid out is entered on the keyboard. Operation continues automatically until the verify light comes on and closing totalizing key 60 effects completion of the cycle and opens cash drawer 62. The customer's receipt is the same regardless of whether the merchandise tag is returned except for the number of digits identifying the transaction. The perforated tape contains inventory information only if the operation is accompanied by a merchandise tag.

A single item layaway sale with a down payment requires two transactions as illustrated in FIGURE 5a. The first transaction is to provide inventory control data and is treated as a regular tag operation by using the transaction type digit 9. The second transaction is to provide cash control data and is a "no tag" operation using the three digit class number 999 to indicate a deposit. The clerk then enters the amount of the deposit on the keyboard and verifies at the appropriate time by use of the totalizing key 60 which opens the cash drawer.

The three basic types of errors which occur at the point of sale are:

(1) The clerk enters wrong information;
(2) The clerk makes an omission of one or more basic operations; and
(3) The customer wishes to change or delete part of the transaction.

If the clerk number or transaction number is entered incorrectly, pressing the correction key will cause the keyboard to be mechanically cleared before printing any information on the customer's receipt and will cause the tape perforator to go through a complete cycle of operation. An error indication will be printed in the perforated tape, but the tag will not be rejected until verification takes place. The recording operation is then started again.

If the price was entered incorrectly but had not yet been printed on the customer's receipt, the correction key will similarly clear the keyboard and cause completion of the tape perforator cycle so that the transaction can again be initiated.

If the price was printed incorrectly on the customer's receipt, the clerk depresses the correction key. This will only cause completion of the tape perforator cycle but will not change the accumulator. To correct the accumulator the markdown button 41 is depressed and the difference necessary to correct the accumulator is manually entered on the keyboard. The perforated tape record is adequately marked with control information so that the data processing equipment will be appropriately controlled.

If the clerk omits one or more operations, such as, for example, a tax entry, the clerk may subsequently perform the operation, or the clerk may treat the transaction as if the customer wishes to change the transaction as outlined in the next paragraph.

If the customer changes his mind, the clerk performs a refund operation for each tag operation to be deleted. This requires the markdown button to be pressed and the price entered manually so that the subtract key can be depressed. For refund operations of an amount not accompanied by a tag, the usual manual price entry is made and the subtract key is depressed.

KEYBOARD CIRCUIT DESCRIPTION

To produce both a printed record for use as a customer's receipt and a punched record for use in central office data control equipment, it is necessary that some type of sequence control device be incorporated to assure that the information in both records occurs in some sort of predetermined sequence. FIGURE 6 shows a functional block diagram which includes in addition to tag reader 30, keyboard 32 and tape perforator 34, a sequence scanner 92 which in the actual equipment illustrated is a conventional type of stepper switch. Since the same coding system is used on the merchandise tags and the perforated tape, a stepper switch (FIGURE 8) having five banks of contacts each having an associated wiper arm, A–1, A–2, A–4, A–7 and A–P is used. Each of the banks associated with arms A–1, A–2, A–4 and A–7 is used as an information channel to effect reproduction on the perforated tape, of the coded information stored on the merchandise tag. The fifth bank of contacts associated with the wiper arm A–P is used for programming and control purposes.

A second function of the sequence scanner 92 is to provide price information through coding relay circuit 96 and key actuator circuit 98 to keyboard 32. The closing of key contacts in the keyboard (FIGURES 7 and 12), whether manually or by signals from tag reader 30, causes operation of the paper punches in tape perforator 34. As will be more fully described below, when price information is being transmitted from the tag reader to the keyboard, that information is not present in channel 94 but must come to the tape perforator 44 from contact coding matrix 100 in the keyboard.

Mechanical accumulator 102 is the usual type of accumulator accompanying a 10 key adding machine and is effective to operate printing unit 104 which produces the customer's receipt. Non-add functions entered on keyboard 32 are printed by printing unit 104 and punched by the tape perforator, but totals and subtotals from the mechanical accumulator are only reproduced by printing unit 104 on the customer's receipt and are not punched on the perforated tape.

A schematic diagram of the entire electrical circuit is shown in FIGURES 7 and 8. Coding relay circuit 96 in FIGURE 6 includes coding relays K1, K2, K4 and K7 in FIGURE 7. Relay K1 has four sets of switch contacts K1–2, K1–4, K1–1 and K1–3, more clearly shown in FIGURE 11, connected to the various ones of the key solenoids 106 which have been added to the keyboard of a known type of adding machine, and to the switch contacts on relay K2. The switch contacts of relay K2 are connected through the switch contacts of relays K4 and K7 to a negative terminal 108 of the power supply. The operation of this type of circuit for converting from a counting system based on a radix of 2 to a counting system based on a radix of 10 is well known and will not be further described.

Key contacts C–1 through C–0 includes two sets of mechanically inter-related contacts associated with key solenoid coils 106. Since the electrical circuits associated with each set perform separate functions and because both contacts connected to the punch selector coils PL in the 3, 5, 6, 8, 9 and 0 positions must be simultaneously energized, the sets of contacts are shown in separate locations in FIGURE 7 and the physical arrangement shown in FIGURE 12 includes an insulating layer 110. The key levers 111 are pivotally mounted on pins 111a and may be moved to their down position either by pressing on the associated key or by energization of the associated solenoid 106. The downward movement of key lever 111 causes all the associated key contacts to close in addition to its normal function of mechanically entering the selected digit in the adding machine mechanism.

The upper pair of contacts connected to minus power supply terminal 114 are holding contacts which keep the selected key solenoid energized through diode 116 and contact KC–5 to the positive supply terminal 118. The lower pair of contacts are connected from the negative supply terminal 114 (114a in FIGURE 7) through corresponding ones of contacts KC–4, KC–3, KC–2 and KC–1 to punch selector magnets LP–5, LP–4, LP–3 and LP–2, respectively, of the tape perforator. For example closure of contacts C–3 will complete in addition to the holding circuit for coil 106, a circuit from minus power supply terminal 114a through contacts KC–4 and KC–3, coils LP–5 and LP–4, conductor 119 and contacts PTC (FIGURES 8 and 11) to a positive power supply terminal. Contacts PTC are tape interlock contacts that are closed by insertion of paper tape in the perforator.

Energization of punch selector coils LP–5 and LP–4 will effect punching of vertically aligned holes in the paper tape shown in FIGURE 3 in the one and two horizontal column positions thus recording digit 3.

The punch selector coils LP–2, –3, –4 and –5 can also be energized through switch contacts KF–1, –3, –2 and –4. When coil KF is energized thus transferring its switch contacts to their alternate position, a circuit also shown in FIGURE 10 and 13 is completed to the negative power supply through the wiper arm associated with the respective KF switch contact, the terminal of the stepper switch bank with which the wiper arm is in contact, the associated sensing element in the tag reader which selectively contacts a negative bus bar in accordance with the coding on the merchandise tags. The voltage on the negative bus bars comes from conductors 121 and 122 in FIGURES 8 and 13 through contacts KT–1 and KP–1 respectively, and through KE–2 from negative supply terminal 123.

PROGRAMMING CIRCUIT DESCRIPTION

The circuit connections between the stepper switch contacts and the sensing elements of the tag reader are diagrammatically illustrated on FIGURES 8 and 10 while the control circuits for programming the various modes of operation are shown connected to the fifth stepper switch bank in the lower part of FIGURE 8. FIGURES 9 through 13 show the same circuits but have the various relay contacts physically located adjacent their respective relay coils. The following description of operation will be made with reference to FIGURES 7 and 8, though FIGURES 9 through 13 will be referred to for added clarity on certain features.

All of the relay contacts in FIGURES 7 through 13 are shown in the position they assume when no power applied to the equipment. The following table lists the relay notation, its number of contacts and its descriptive name.

| Relays | Number of contacts | Function |
|---|---|---|
| K1 | 4 | Coding relay. |
| K2 | 3 | Do. |
| K4 | 2 | Do. |
| K7 | 1 | Do. |
| KC | 6 | Anti-repeat relay prevents duplicate punching by the perforator. |
| KM | 4 | Perforator motor relay is de-energized at contact 49 or 50 on the stepper switch at the end of each cycle. |
| KS | 2 | Payout relay is energized by depressing subtract bar on keyboard. |
| KF | 8 | Cycle completion relay becomes energized as soon as price information is entered. |
| KE | 5 | Error relay is energized by correction key on keyboard or by tape feed button on perforator panel. |
| KT | 6 | Tag relay is de-energized during normal tag operations; otherwise energized. |
| KD | 5 | Markdown relay is energized by closing markdown button on keyboard to permit manual price entry. |
| KP | 4 | Tag type relay is de-energized when price is supplied by long tag or manually entered on the keyboard. |

When main power switch 142 is turned on and the equipment is ready to be operated but no cycle of operation has been started, relay KT is energized thus causing each of its six contacts to be transferred to the position not shown in the drawings. All other relays retain their de-energized condition until the beginning of a cycle of operation.

STEPPER SWITCH OPERATION

The stepper switch includes in addition to the four banks of contacts for transmitting the encoded information from the merchandise tags an additional bank having a wiper arm A—P. The contacts on this bank are numbered from 1 to 52. The stepper switch wiper arm A—P for this bank of contacts is connected through diode 126 and switch contacts PLC to negative supply terminal 128. Thus as the stepper switch advances, the moving arm A—P supplies a negative voltage to the circuit connected with its associated contacts. The other stepper switch arms A–1, A–2, A–4, and A–7 are connected to switch contacts KF–1, KF–3, KF–2 and KF–4 of FIGURE 7 and to a positive voltage through coils K7, K4, K2 and K1 and switches KD–4 and KC–5.

The stepper switch coil S is connected from the positive power supply through a first set of interrupter contacts 130 to switch contact KM–1. The circuit to the negative supply terminal 128 is then completed through a second set of interrupter contacts 132, stepper switch contact 2 which is connected in parallel with contacts 1 through 8 and 50 through 52, stepper switch wiper arm A—P and switch PLC. When perforator motor relay coil KM is energized and contact KM–1 is transferred to its alternate position, stepper switch coil S is connected directly through switch contacts PLC to the negative supply terminal 128.

Interrupter contacts 130 and 132 are mechanically a part of the stepper switch mechanism and open as soon as the driving pawl has been cocked due to energization of coil S. When coil S is de-energized, the driving pawl causes the wiper arms to advance and interrupter switches 130 and 132 again close.

The stepper switch in the present equipment operates quite rapidly through position 1 through 8 as the coil is energized through a circuit that is always completed except for mechanically associated interrupter contacts 130 and 132. Thus as soon as the coil is energized, contacts 132 open and cause the wiper arms to advance at which time contacts 132 again close. At position 9, the circuit through the wiper arm A—P is broken and the stepper switch coil S stays de-energized.

After switch KM–1 is transferred, the stepper switch coil is always energized except when contacts PLC are open. As will be discussed below, contacts PLC open after the tape perforator punches are energized. Thus advancement of the stepper switch is synchronized with operation of the tape perforator.

The 600 ohm resistor in series with stepper switch limits the current flow through coil S as soon as the driving pawl is cocked and interrupter contacts 130 open.

Referring now to FIGURES 8 and 11, punch selector coils LP–1, LP–2, LP–3, LP–4, LP–5 and LP–6 are part of a known type of tape perforator which are mechanically linked with switch contact PCC to cause PCC to close each time any one or more of the punch selector coils LP are energized. This mechanism is well known and accordingly is not illustrated in detail. Closure of contacts PCC completes a circuit from negative power supply terminal 128 through perforator clutch coil 136, conductor 119 and switch contacts PTC to the positive power supply. Switch contacts PTC are mechanically held closed by the presence of tape in the perforator and remain closed so long as the tape supply mechanism operates satisfactorily. Energization of perforator clutch coil 136 causes cam shaft 140 (FIGURE 11) to complete a single revolution thus momentarily opening lock contacts PLC just after the punch cycle has started. As soon as contacts PLC open, the stepper switch wiper arms advance. Thus by proper adjustment of the cam on shaft 140, synchronization of the punching operation and advancement of the stepper switch is obtained.

When power switch 142 is turned on, the only electrical circuit change that takes place is energization of coil KT from positive power supply terminal 144 through a mechanical tag feeler switch 146 (FIGURES 8 and 13) opened only when a tag is in the tag reader, and switch contacts KE–2 to negative supply terminal 123. This causes all switch contacts of relay KT to transfer to their alternate position from that shown in the drawings. The circuit through the tag reader clutch coil is now conditioned to be energized by insertion of a tag on the tag carriage which closes the tag reader clutch microswitch to complete a circuit from the negative supply terminal 150, clutch microswitch, KT–3 transferred, the upper manual eject contact 42 and tag clutch coil to positive power supply terminal 152.

The stepper switch wiper arms normally return to contact 9 at the end of each cycle thus energizing clerk light 48 from positive power supply terminal 154 through stepper switch contact 9, stepper switch arm A—P, contact PLC to negative supply terminal 128. If clerk switch 70 on the perforator control panel is in the "out" position, contact 9 of the stepper switch will be connected through the upper switch contacts to be in parallel with switch contacts 1 through 8 thus causing the stepper switch to home on the contact 10 thereby eliminating entry of the clerk digit on the keyboard at the beginning of each transaction.

OPERATION WITH LONG TAG

Assuming that the clerk switch is in the number 9 position as shown, stepper switch wiper arms will be at rest on contact 9 and relay KT will be energized prior to the initiation of the cycle of operation. Since a long tag is assumed to accompany the transaction to be recorded, the tag is placed on carriage 37 on the tag reader and the carriage is manually pushed in. The motor in the tag reader is started by the tag motor microswitch in FIGURE 13, and the tag clutch microswitch is subsequently closed thus energizing tag clutch coil through transferred contacts KT–3. The effect of energizing the tag clutch coil and the tag reader motor causes the tag carriage to rise and after a certain delay, forces tag switch 146 open. Relay coil KT is thus de-energized thereby causing all the KT contacts to transfer to the position illustrated in the drawings. With the transfer of switch contacts KT–3, the tag clutch coil is de-energized thus leaving the carriage in the tag reader stopped in its raised position.

The raising of the carriage also causes the lever on the price switch to open since this part of the discussion assumes a long tag as illustrated in FIGURE 2 is used. Since the lower tag field 44 is present, price switch contacts 84 open assuring that price coil KP does not energize.

To initiate the recording operation on the perforated tape and customer's receipt, it is necessary to enter the clerk identification digit on the keyboard. Assuming the digit 3 is entered to identify the clerk, all electrical contacts associated with switch C–3 are closed. This completes a first circuit from negative power supply terminal 114 through contacts C–3 and switch contacts KC–4 and KC–3 to punch selector magnets LP–5 and LP–4 through conductor 119 and tape supply contacts PTC to positive power supply terminal 162. Movement of the punch bails caused by energization of coils LP–4 and LP–5 effects momentary closure of switch contact PCC thus completing the circuit from negative power supply terminal 128 through perforator clutch coil 136 to the positive potential on conductor 119.

At the same time an additional circuit is completed through diodes 163 and 164 and perforator motor coil KM to positive terminal 165. Energization of coil KM causes contacts KM–2 to transfer thus completing a circuit from negative power supply terminal 166, contacts KM–2, coil KM, and resistor 168 to positive power supply terminal 165.

The circuit to perforator motor 170 is completed through contacts KM–3, while transfer of contacts KM–1 shifts control of the stepper switch operation from interrupter contacts 132 to switch contacts PLC. Contacts KM–4, located near contact 31 of the stepper switch in FIGURE 8, are closed to complete a circuit for certain control operations that will be discussed below.

Coil KC is momentarily energized through a circuit from negative power supply terminal 128, as switch contacts PCC are closed through diode 172 and conductor 173 to positive terminal 174. Energization of coil KC causes transfer of switch contacts KC–4, KC–3, KC–2 and KC–1 thus breaking the circuit to punch selector coils LP to prevent double punching and completing a holding circuit for coil KC until the key contact C–3 opens. Switch contact KC–5 is also opened at this time thus breaking the holding circuit for the energized key solenoid coil 106 from positive power supply terminal 116 through contacts KC–5, diode 118, the energized key solenoid coil and associated contacts to the negative supply terminal 114. This then breaks the holding circuit for coil KC only after the key contacts open.

Theoretically the lower contacts on switches KC–1, –2, –3 and –4 are not necessary because when contacts KC–5 open the circuit for holding the key solenoid 106 energized is broken. Since contacts PCC in the perforator remain closed only a short time and the key contacts are occasionally slow in opening the KC relay would become de-energized while the key contacts were still closed thus causing double punching. By use of the lower contacts on switches KC–4, KC–3, KC–2 and KC–1 to hold coil KC energized until the key contacts are opened, double punching by the perforator is positively prevented.

Energization of perforator clutch coil 136 causes the punches selected by punch magnet coils LP to punch a binarily coded decimal digit in the tape. A few milliseconds after the punching operation starts, the cam on shaft 140 causes contacts PLC to open which de-energizes the stepper switch coil thereby causing the wiper arms to advance to the next contact which at this point in the description is contact 10 of the stepper switch. Contact PCC is now open until the punch selector coils LP are again energized. Opening contacts PCC de-energizes perforator clutch coil 136. While the clerk digit has already been punched in the tape, the keyboard does not print the clerk number until the non-add solenoid in the adding machine is energized which occurs when the stepper switch wiper arms are at contact 14.

The functional operations which have been completed at this time in addition to the recording of the clerk identification digit in column 1 of the perforated tape shown in FIGURE 3, include the advancement of the tape in the perforator and the advancement of all the stepper switch wiper arms to contact 10 thus de-energizing the clerk light 48 and energizing class light 50 through the stepper switch contact bank associated with wiper arm A–1 to a negative power supply terminal 178 through resistor 180 and to positive supply terminal 113 through wiper arm A–1 contacts KF–4, coil K1 and contacts KD–4 and KC–5.

Since all wipers on the stepper switch are ganged together to move simultaneously, when wiper A–1 is positioned on contacts 10, 11 or 12, the class indicator light remains illuminated. This serves as a visual indication to the sales clerk that the class digits are now to be entered on the keyboard. Since it is assumed a tag accompanies this transaction, the transaction type number consists of a single digit which is entered in the keyboard. If the instant operation is a sales transaction, the digit 1 is entered in the keyboard. This closes contacts C–1 thus energizing punch selector coil LP–5 which mechanically causes contacts PCC to close thus energizing perforator clutch coil 136 thereby causing the cam on shaft 140 to momentarily open switch PLC to cause the stepper switch wiper arms to advance to position 11. Anti-repeat coil KC is also again momentarily energized by the closing of contacts PCC to effect de-energization of the keyboard solenoid 106 which had been energized by the closing of the number 1 key on the keyboard when the class digit was entered.

The sequence of operation for positions 11 and 12 of the stepper switch are identical since the contacts of the stepper switch bank associated with arm A—P are electrically connected together. Since a tag is in the tag reader, contact KT–5 is in the position illustrated in FIGURE 8, thus immediately energizing the perforator clutch coil 136 and anti-repeat solenoid KC coil from negative supply terminal 128 through switch contacts PLC and the stepper switch wiper arm AP without requiring further action by the clerk. Energization of clutch coil 136 causes the tape in the perforator to advance without operation of any punch bails and opens contacts PLC to advance the stepper switch.

Stepper switch contact 13 in the illustrated embodiment is permanently wired to perforator clutch coil 136 to advance the stepper switch to contact 14 in all methods of operation without recording any information in the perforated tape. This contact has been arbitrarily included to permit five digits of control data to be entered in the system for added flexibility of operation. The first five vertical columns in the information field on the perforated tape of FIGURE 3 correspond to stepper switch positions 9, 10, 11, 12 and 13. By rearranging the circuits connected to the various stepper switch terminals, different coding arrangements can be used for recording the information entered on the keyboard concerning factors accompanying the various transactions that vary with the different transactions such as clerk and transaction type information which is independent of the recorded information on the merchandise tags.

When the stepper switch arm reaches contact 14, the non-add solenoid on the keyboard is energized by the negative voltage on the stepper switch arm A—P through switch contacts KE–3 and KC–6. Energization of the non-add coil causes the printing mechanism associated with the keyboard to print on the customer's receipt the clerk identification number and transaction type or class number as shown in FIGURES 4 and 5 followed by an "N" thus indicating that these digits are not stored in the accumulator. Non-add contacts 184 in FIGURE 7 and FIGURE 12 are also closed by energization of the non-add coil thus completing a circuit from the minus supply terminal 114 through non-add contacts 184, switch contacts KC–1 and punch selector coil LP–2 thus causing a hole to be punched in the number 2 column on the perforated tape and advancing the stepper switch to contact 15.

Position 15 on the stepper switch corresponds to position 7 in the field on the perforated tape. Terminals 15 through 19 of the upper four banks of contacts on the stepper switch associated with arms A–1, A–2, A–4 and A–7 are connected to the corresponding sensing means in the tag reader which selectively supply a negative voltage to the stepper switch contacts depending upon the information punched in the lower price field 44 of the merchandise tag. The presence of a negative voltage connected to the respective wiper arms in the various positions will selectively energize certain of the codings relays K1, K2, K4 and K7. Energization of any one or more of those coils will cause transfer of their switch contacts which are effective to translate the binary information to decimal information by energizing the appropriate key solenoid 106, which represents the digit to be recorded. Assuming that digit 6 is to be entered, relays K2 and K4 are energized thus completing a circuit from negative supply terminal 108 in FIGURE 7 through contacts K7–1 and transferred contacts K4–1 and K2–1 to energize the number 6 key solenoid 106. This closes key contacts K6 energizing punch selector magnets LP–4 and LP–3 through switch contacts KC–3 and KC–2 respectively. The punching operation and the advancement of the tape and stepper switch takes place as previously described to prepare the equipment to record a second digit of the price information.

The second, third, fourth and fifth digits of the price information are recorded in the same manner with operation being continuous until contact 20 on the stepper switch is reached by the stepper switch wiper arms. At this point the five digits of price information have been recorded on the perforated tape and entered in the accumulator but not printed on the customer's receipt. When arm A—P reaches position 20, the add solenoid is automatically energized by a circuit from negative terminal 128 through contacts PLC, wiper arm A—P, contacts KP–3, contacts 186 on the inventory switch, KE–4, transferred contacts KM–4 and contacts KT–6 and KD–3. Energization of the add solenoid activates the adding machine motor which causes the price to be printed on the paper record comprising the customer's receipt and stored in the accumulator.

The add solenoid also closes the sales switch contacts 188 which energize cycle completion relay KF from positive power supply terminal 165 through closed sales contacts 188, diode 190 and switch contacts KP–3 to the negative voltage on the stepper switch wiper arm A—P. Contacts KF–6 thus close and hold relay coil KF energized through contacts KM–2 from the negative supply terminal 166. Coil KF remains energized until coil KM is de-energized when the stepper switch wiper arm advances to position 49 on the stepper switch.

The transfer of contacts KF–1, KF–2, KF–3 and KF–4 (FIGURE 7) causes the information from the tag reader to be supplied directly to the perforator selector solenoids LP and bypasses the key solenoids of the keyboard. This prevents any further information from being supplied from the merchandise tag to the keyboard to be printed on the customer's receipt.

Contact KF–5 (FIGURE 8) closes thereby setting up an additional circuit through which perforator clutch coil 136 may be energized to provide continuity of operation even though no information is transferred to the perforator tape.

Contacts KF–7 and KF–8 (FIGURE 8) both close thus supplying a negative voltage to certain stepper switch terminals for producing holes in the perforated tape to identify the particular type of operation, i.e. long tag, short tag, manual price entry, inventory, etc.

An additional circuit is now completed from the negative supply terminal 166 through transferred relay contacts KM–2, KF–6, KF–7 and contacts KT–2 and KD–1 to terminal 20 on the bank of contacts on the stepper switch associated with wiper arm A–4. This energizes punch selector coil LP–3 through transferred contact KF–3, thus causing the number four digit to be punched in the paper tape in information column 12 to identify the long tag type transaction.

Whenever coil KF is energized, coil KC likewise is energized through a circuit from negative supply terminal 166 through contacts KM–2 and KF–6 and diode 192 to positive power supply terminal 174. Relay coil KC will remain energized throughout the remainder of the recording cycle thus transferring contacts KC–1, KC–2, KC–3, KC–4, KC–5 and KC–6 to their non-illustrated positions to prevent interference from spurious depression of keys on the keyboard.

At this point the stepper switch has advanced to contact 21 which corresponds to column 13 in the perforated tape and now completes a circuit from negative supply terminal 128, contacts PLC, stepper switch arm A—P through closed switch contacts KF–5 to perforator clutch coil 136. This circuit parallels contacts PCC so that in the event no information is supplied to the punch selector coils LP, the perforator clutch coil 136 will still be energized to advance the tape and cause contacts PLC to open to assure the stepper switch wiper arm will advance to contact 22. Sufficient delay is incorporated in the system to assure that direct energization of the perforator clutch coil 136 will not advance the perforated tape before the punch bails have been selected by the circuits through the tag reader. Since contacts 21, 22, 23, 24 and 25 are connected in parallel, stepper switch wiper arm will advance to position 26 and record in positions 13 through 17 on the perforated tape the information, if any, in the short tag price field. This information is not printed by the keyboard on the customer's receipt because cycle completion relay KF has been and remains energized throughout the remainder of the cycle to prevent further digital entry to the punch selector coils LP through the keyboard either manually or from the tag reader.

When the stepper switch wiper arm is at terminal 26, the punch selector solenoid LP–3 is energized through transferred contacts KF–3, wiper arm A–4, contacts KD–1 and KT–2 and transferred contacts KF–7, KF–6 and KM–2 to the negative supply terminal 166. This again causes the digit 4 to be punched on the tape and the stepper switch advances to terminal 27 corresponding to position 19 on the perforated tape.

The negative voltage on the stepper switch wiper arm A—P completes a circuit from terminal 27 through terminal 47 on the stepper switch to punch selector coils LP–1 and LP–6 to cause holes 194 shown in FIGURE 3 to be punched in the tape. These holes in the tape are used to indicate the beginning of the item identification field in the perforated tape to aid in the information handling and tape orientation during the tape reading operation.

From this position through contact 46 on the stepper switch and position 37 of the tape, information concerning the identification of the article as stored in field 45 of the merchandise tag is transferred directly to the perforated tape in a hole for hole manner. For example each hole occuring in the information field on the merchandise tag will cause feelers 194 of FIGURE 13 in the tag reader to contact the energized bus bar to supply voltage to the corresponding stepper switch terminal to cause a hole to be punched in the perforated tape as the stepper switch advances from terminal 27 through terminal 45. Automatic operation of the stepper switch stops with the wiper arms on terminal 46. Contacts 27 through 45 of the bank of the stepper switch associated with arm A—P are connected together and to terminal 19 thus completing a circuit through switch contacts KP–4 and KF–5 to clutch coil 136 in the same manner that the similar circuit was completed for operation on contacts 21 through 25. This allows advancement of both the tape and the stepper switch even though there are positions in the merchandise tag where no information is coded and produce a constant length information field on the perforated tape regardless of the amount of information on the tag.

Associated with terminal 46 of the stepper switch is a circuit from positive power supply terminal 196 through a large resistor 198, contacts KE–1 and verify light 54 to positive supply terminal 200. Verify light 54 is normally de-energized since the same positive voltage is supplied to both terminals. The negative voltage applied by the stepper switch wiper arm A—P to terminal 46 reduces the potential applied to one terminal of the verify light 54 thus causing the light to become energized to visually indicate to the sales clerk that the figures printed on the paper record of the keyboard are to be checked.

Manual depression of verify key 58 completes a circuit from negative supply terminal 162 to contact 46 of the stepper switch bank associated with wiper arm A–4 to cause punch selector coil LP–3 to be energized thus causing the digit 4 to be punched in the perforated tape and advancing the stepper switch to terminal 47.

At the same time the tag clutch coil is energized through switch KT–3 to positive power supply terminal 152 thus causing the tag to be ejected from the tag carriage and the tag reader to return to its original position.

If the totalizing or total verifying key 60 is depressed instead of the verifying button, the same functions will take place, and in addition, the perforated tape will contain a hole in the number 7 channel caused by energization of coil LP–2 through the number 46 contact on the stepper switch associated with wiper arm A–7 and the cash drawer will be opened.

When the stepper switch wiper arms move to terminal 47, punch selector coils LP–1 and LP–6 are again energized and punch selector coils LP–2, LP–3 and LP–4 are energized through their respective stepper switch wiper arms to negative supply terminal 204 thus producing the pattern illustrated in position 39 in the perforated tape in FIGURE 3.

When the stepper switch wiper arm is in position 48, only punch selector coils LP–1 and LP–6 are energized thus producing the pattern shown in position 40 of the perforated tape.

When the stepper switch wiper arm advances to terminal 49, the negative voltage on the stepper switch wiper arm is connected through the lower contacts 205 of clerk switch 70 to conductor 206 to the positive terminal of relay coil KM thus applying a negative voltage on both terminals coil KM. This de-energizes coil KM and causes its contacts to transfer to their initial position as illustrated in the drawing.

Advancing of the stepper switch is now controlled by interrupter contacts 132 since KM–1 is no longer connected to switch PLC while the stepper switch wiper arms advance from terminals 50 to 52 and from terminal 1 to terminal 9 where all operation ceases until another cycle is initiated by entry of the clerk identification number.

CLERK SWITCH OPERATION

In the event no clerk identification number is used and clerk switch 70 has been previously switched to its alternate position, when the stepper switch wiper arm is on terminal 49 a circuit is completed through contact 205 of the clerk switch and contacts KF–5 to perforator clutch coil 136 thus advancing the perforated tape of FIGURE 3 to position 2 before the cycle stops. This means the operation is initiated by the entry of the transaction identification digit and that the clerk digit is omitted from the sales receipt. The clerk digit is also omitted from the perforated tape. However, to retain a constant length information field in the tape, the equipment merely passes by the clerk position before stopping after completing the previous cycle. The pattern of the recorded information on the perforated tape thus remains uniform regardless of whether a clerk identifying digit is used. This is very important when the tape is being read for transmission to the central data processing equipment since the information is read in blocks of 40 columns that are oriented by the X and Y punched holes. Relay coil KM is then de-energized by the negative voltages on wiper arm A—P through contact 50 and conductor 206.

If the stepper switch wiper arms are in their normal stopping position when the clerk switch 70 on the perforator control panel is turned to "no clerk" or "out" position, the stepper switch coil S is energized through lead 206, interrupter contacts 132 and KM–1 and advances to contact 10. The tape is not advanced since the perforator motor relay KM and clutch coil 136 are not energized, and the next cycle of operation will accordingly have 39 positions instead of 40. Similarly, if the clerk switch is turned from "no clerk" to "clerk" position, the tape having previously advanced an extra position before de-energizing the perforator motor, will have 41 positions instead of 40.

ERROR RELAY OPERATION

To properly set up the equipment after the clerk switch has been changed, or any other time an error has been detected, error relay KE is energized by momentarily depressing either correction key 66 on the keyboard or tape feed button 69 on the perforator control panel. This transfers the KE contacts to their alternate position and causes the tape and stepper switch to advance automatically through one cycle of operation to properly orient the equipment for recording the next business transaction.

Coils KF and KC are both energized through contacts KE–6 and the depressed correction or tape feed key thus closing contact KF–6 and applying negative voltage to coil KM. This causes contact KM–2 to close thus providing a holding circuit for coils KM, KF and KE from negative power supply terminal 166 through contacts KM–2, KF–6 and KE–6. Opening contacts KE–2 breaks the line supplying negative voltage from terminal 123 to coils KT and KP and the feeler bus bars in the tag reader thus assuring all KT and KP contacts are in their illustrated position regardless of the presence of either type tag in the tag reader.

A negative voltage from terminal 166 is applied through transferred contacts KM–2, KF–6, and KF–7 and contacts KT–2 and KD–1 to terminals 9, 10, 14, 20 and 26 of the stepper switch bank associated with arm A–4 thus energizing punch selector solenoid LP–3 in those stepper switch positions to cause the stepper switch to automatically continue its cycle of operation.

The stepper switch continues to advance automatically through positions 11 and 12 due to the negative voltage on wiper arm A—P applied through contacts KT–5 to perforator clutch coil 136. Terminal 13 directly connects the negative voltage on wiper arm A—P to the clutch perforator coil 136. Terminal 14 is also connected to the perforator clutch coil 136 through transferred contacts KE–3 and contacts KT–5 thus eliminating the non-add operation of the adding machine. Contacts 15 through 19 are connected to the perforator clutch coil 136 through contacts KP–4 and transferred contacts KF–5.

Advancement continues through position 20 since punch selector coil LP–3 is energized. Since KE–4 has opened, the add solenoid is not energized during this operation. Wiper arm A—P is connected from terminals 21 through 25 through closed contacts KF–5 to the perforator clutch coil 136 and causes stepper switch to advance to terminal 26. The voltage from wiper arm A–4 again energizes punch selector coil LP–3 thus advancing the stepper switch to terminal 27.

The negative voltage on wiper arm A—P is connected from terminal 27 to terminal 47 of the stepper switch to punch selector coils LP–1 and LP–6, energization of which causes the stepper switch to advance to terminal 28. The negative voltage from wiper arm A—P is connected by terminals 28 through 45 inclusive through switch contacts KP–4 and closed contacts KF–5 to the perforator clutch coil 136 thus causing operation to advance to terminal 46.

At terminal 46, wiper arm A—P is connected through transferred contact KE–1 to the stepper switch contact associated with wiper arm A–2 to energize punch selector coil LP–4 and advance the stepper switch to position 47. The remaining contacts on the stepper switch operate in their usual manner to cause the tape perforator motor relay KM to become de-energized and the stepper switch to continue automatically and stop at terminals 9 or 10 in accordance with the setting of clerk switch 70 as discussed above.

It is thus apparent that resetting of the system takes place automatically by depressing either correction key 66 on the keyboard or tape feed button 69 on the perforator control panel during which time no information is transferred from the merchandise tag or from the keyboard. This operation is independent of whether a tag is in the tag reader in that it can be initiated at any point during the operating cycle and after initiation the operation continues automatically until the cycle is completed. At stepper switch position 46 where operation normally stops and verify light is illuminated, contact KE–1 is transferred due to energization of the error relay KE to cause a hole in the number 2 column at this position to be punched in the tape.

It should be observed that this special error indicating signal is not punched until the last variable operation in cycle of the tape perforator. The tape reading equipment in which the perforated tape is read reads the forty columns of information of each field in the tape simultaneously and has a sensing element which searches for the presence of a hole in the error indication position. When the sensing element detects an error mark, the entire block of information is discarded and the tape reading equipment advances the tape to the next position.

SHORT TAG OPERATION

The recording operation of a transaction accompanied by a short tag is initiated by inserting the tag in the tag reader thus energizing the tag clutch from negative terminal 150 through clutch microswitch and transferred contacts KT–3 to positive power supply terminal 152. Tag switch 146 opens thus de-energizing relay KT and causing all KT contacts to transfer back to the position illustrated in the drawings.

Since the lower price field 44 of the merchandise tag illustrated in FIGURE 2 has been removed thus providing a "short" tag, price switch 84 remains closed thus energizing relay coil KP from negative terminal 123 through closed contacts KE–2, KT–1 markdown contacts KD–2 and inventory switch 210 to positive terminal 144.

The clerk and transaction identification digits are entered in the same manner as when a "long" tag is used and operation is identical through position 14 of the stepper switch where the clerk identification and transaction information is printed as a non-add function on the customer's receipt. Since coil KP is energized, switch blade KP–4 connected to stepped switch terminals 15 through 19 associated with wiper arm A—P is transferred to cause the perforator clutch coil 136 to be immediately energized thus causing the perforated tape and the stepper switch wiper arms to advance to position 20. The bus bars in the lower price field in the tag reader are de-energized by opening of contacts KP–1.

The negative voltage on wiper arm A—P is connected from terminal 20 through transferred contacts KP–3 to perforator clutch coil 136 to thus advance operation to terminal 21. Advancement of the stepper switch at this point is dependent upon price information being present in the short tag price field as there is no circuit completed at this time for connecting the negative voltage from wiper arm A—P to the perforator clutch coil 136. In the event there are no holes in the corresponding positions of the mechandise tap price light 52 is illuminated and price information could be entered on the keyboard, though operation of the system in its preferred manner will not utilize this feature.

The price information from the short tage is then supplied to the various key contacts through coils K1, K2, K4 and K7. The customer's receipt is thus printed in the same manner as when a long tag is used. However, the price information is punched in the perforated tape in positions 13 through 17, instead of positions 7 through 11. In position 26 the negative voltage from wiper arm A—P, is connected through closed contact KP–2, inventory switch 186, KE–4, KM–4, KT–6 and KD–3 to add solenoid. This causes the adding machine to print automatically the price on the customer's receipt and momentarily close "sales" contacts 188 to energize cycle completion coil KF thereby transferring all the KF contacts. The contact associated with wiper arm A–1 is energized through transferred contact KF–8, price switch 84, KT–1 and KE–2 to negative terminal 148 to provide a special hole in the perforated tape identifying short tag operation. Wiper arm A–4 is also energized through contacts KD–1, KT–2, KF–7, KF–6 and KM–2.

Operation then continues automatically the same as with long tag operation. Again, verify light 54 is illuminated at position 46 at which time the sales clerk has the option of pressing correction key 66 to reinitiate the starting cycle, pressing verify key 58 to complete the cycle, or pressing total verify key 60 to complete the cycle of operation and cause the cash drawer to open.

If the correction key is closed, the tag is not ejected from the tag reader but remains in position for initiating the next recording operation. If the customer has changed his mind, the tag may be ejected by manually closing the tag ejection button on the tag reader. All other operations cause automatic ejection of the tag from the tag reader.

MANUAL PRICE ENTRY

When it is desired to enter the price manually and the transaction is accompanied by either type of tag, markdown switch 41 on the keyboard is depressed thus energizing markdown relay coil KD from negative power supply terminal 123 through markdown switch 41, coil KD and inventory switch 210 to positive power supply terminal 144. Markdown light 46 remains illuminated so long as coil KD is energized. Contacts KD–5 close to provide a holding circuit for coil KD and contacts KD–2 open to prevent the KP relay from transferring if a short tag is used, thus assuring price information will be recorded in positions 7 through 11 in the perforated tape.

Operation is initiated by inserting the tag in the tag reader and supplying the clerk and transaction digits as described in connection with regular tag operation. The non-add solenoid is energized and the stepper switch wiper arms reach terminal 15. Since contacts KD–4 in FIGURE 7 have opened, coils K1, K2, K4 and K7 cannot be energized by the negative voltage supplied to wiper arms A–1, A–2, A–4 and A–7. Thus information from the price field of the long tag cannot be supplied to the keyboard, and since cycle completion relay KF has not yet been energized no information can be supplied to punch selector coils LP. Automatic operation stops because the negative voltage applied to wiper arm A—P at contact 15 is not applied to perforator clutch coil 136, but is only applied to price light 52. The price information is now entered by depressing the keys on the keyboard thus causing the price digits to be punched by the punch bails selected by coils LP-2, LP-3, LP-4 and LP-5 in the perforated tape as they are entered in the keyboard to advance the stepper switch to position 20.

The add solenoid does not operate automatically because KD-3 has transferred, but instead the negative voltage from wiper arm A—P is supplied from transferred KD-3 to coil KC to prevent further entries on the keyboard from being recorded in the perforated tape. The motor bar is then pressed by the operator to print out the price information on the customer's receipt and to energize the add solenoid and cause momentary closing of sales contacts 188 to energize cycle completion relay coil KF.

In the event the cash entry is to be "paid out" instead of added, the subtract key is pressed instead of the motor bar, thus momentarily closing "paid out" contacts and energizing coil KS. Closure of contacts KS-3 then applies the negative voltage to cycle completion relay coil KF. With either "add" or "subtract" operation, closing contacts KF-6 and KF-7 supplies a negative voltage from terminal 166 through KM-2, KF-6, KF-7, KT-2 and transferred KD-1 to the contacts at positions 20 and 26 on the stepper switch bank associated with wiper arm A-2. This causes a hole in the number 2 channel to be punched in the perforated tape thus identifying the type of operation as manual price entry. The fact that a tag accompanies the operation is also indicated because KT-2 is in its illustrated position.

Operation then continues in the usual manner until the stepper switch wiper arms reach contacts 46 at which time verify light 54 is illuminated and operation halts. Closing either verify key 58 or total verify key 60 applies a negative voltage to closed contacts KS-1 which if closed, supply a negative voltage to wiper arm A-1 and cause punch selector coil LP-5 to be energized thus punching a special subtract identifying hole in the perforated tape as the cycle completes in its usual manner.

The negative voltage from verify button or total verify button is applied through conductor 210 to the usually positive terminals of markdown light 46 and coil KD thus de-energizing the coil and returning the circuits to their usual initial condition. If, however, the error relay has been energized, operation does not stop at terminal 46 of the stepper switch as the contact associated with wiper arm A-2 has negative voltage applied to it thereby energizing punch selector magnet LP-4 and causing the operation to continue without de-energizing markdown coil KD so that the correction operation is ready for manual price entry without again pressing markdown control 41.

NO TAG OPERATION

When a particular cash entry is to be recorded that is not accompanied by a merchandise tag such as when sales tax or Federal excise tax is involved, operation is initiated by entering the clerk digit at position 9 on the stepper switch and the first number of the three digit number at position 10 thus advancing the stepper switch to position 11. Class light 50 remains illuminated through wiper arm A-1, contacts KF-4, coil K1 and contacts KD-4 and KC-5. The negative voltage from wiper arm A—P in position 11 is not applied to perforator clutch coil 136 because tag relay KT is still energized since tag switch 146 normally opened by the presence of a tag in the tag reader is closed. Relay contacts KT-5 is thus open and in its non-illustrated position. Since relay KT remains energized, contacts KT-1 are open thus removing the negative voltage applied to relay KP and the bus bars in the tag reader.

A second digit representing the class number must then be entered in the keyboard to advance the stepper switch to position 12, and a third digit is subsequently required to advance the stepper switch to position 13. Operation at position 13 is automatic as terminal 13 is connected directly to the perforator clutch coil 136 and the non-add solenoid is energized in the usual manner at position 14.

When the wiper arms are at position 15, price light 52 is illuminated and price information is entered in the keyboard in the same manner that was explained when price was manually entered in a transaction accompanied by a tag. When the stepper switch is advanced to position 20, the negative voltage is supplied through contacts KP-3, inventory contacts 186, KE-4 and transferred contacts KM-4 and KT-6 to coil KC in FIGURE 7.

The clerk now has a choice of pressing the motor bar for energizing the add solenoid and closing sale contacts 188 to energize cycle completion relay coil KF, or to press the subtract bar thus closing the paid-out contacts and energizing coil KS and cycle completion coil KF. The perforated tape receives a hole in the number 7 position since wiper arm A-7 is connected to a negative voltage through transferred contacts KT-2, KF-7, KF-6 and KM-2.

The negative voltage from wiper arm A—P is applied through contact terminals 21 through 25 of the stepper switch to the perforator clutch coil 136 through transferred relay contacts KF-5 to advance the stepper switch to terminal 26. Since contacts KF-7 remain closed, negative voltage is again applied from negative supply terminal 166 through transferred contacts KM-2, KF-6, KF-7 and KT-2 to the number 26 contact associated with wiper arm A-7.

At position 27 punch selector coils LP-1 and LP-6 are energized thus advancing the operation to terminal 28. Operation automatically advances from terminal 28 to terminal 46 because the negative voltage applied to the wiper arm A—P is connected to the perforator clutch coil 136 through KP-4 and KF-5 contacts. Operation stops at position 46 and illuminates the verify light 54, thus giving the clerk an opportunity to review the information on the customer's receipt, which in this type of operation is the same as the information on the perforated tape since no item identification information is recorded. Closure of the verify or total verify control on the keyboard will cause the cycle of operation to complete in the usual manner. Since there is no tag in the tag reader, relay KT is energized and contacts KT-3 transferred so that negative voltage through either verify switch will not be supplied to the tag clutch coil.

INVENTORY OPERATION

For inventory operations, the clerk identification number is ordinarily not required by the data processing system. By setting clerk switch 70 to the "no-clerk" position and inventory-sales switch 68 on the tape perforator control panel to the "inventory" position, their respective contacts will be shifted to the non-illustrated position and operation will start from terminal 10 of the stepper switch by insertion of a tag in the tag reader. Operation is the same with either type of tag since the normally positive terminal of tag type identification coil KP is connected through inventory switch contacts 210 to the negative power supply terminal thus preventing coil KP from becoming energized.

The insertion of the tag causes tag switch 146 to open thus de-energizing coil KT and returning switch contact KT-4 to its illustrated position. The negtiave voltage on wiper arm A—P is then applied through contact KT-4, transferred inventory contact 220 to anti-repeat relay KC (FIGURE 7) and to cycle completion relay coil KF thus immediately removing the keyboard from the operating circuit by transferring contacts KC-1, KC-2, KC-3 and KC-4. Energization of coil KF causes contacts KF-6 to close thus applying the negative voltage to perforator motor coil KM and causing contacts KM-2 to close. Negative voltage from terminal 166 is then applied through transferred contacts KM–2 and KM–6 to hold coil KC energized through diode 192 and conductor 172, and through contacts KF–7, KT–2 and KD–1 to stepper switch terminal 10 associated with wiper arm A–4 thus energizing perforator selector coil LP–3 and causing the stepper switch to advance to position 11 and the tape to advance to position 3.

The negative voltage from wiper arm A—P is applied from terminals 11 and 12 through closed contacts KT–5 to the perforator clutch coil 136 thus advancing the stepper switch to contact 13, which automatically causes advancement to contact 14. Since coil KC is energized, contact KC–6 is open and the non-add solenoid in the keyboard is not energized by the negative voltage from wiper arm A—P. The number 14 contact associated with wiper arm A–4 is also connected to the lead that supplied negative voltage to terminals 9 and 10 thus energizing punch selector coil LP–3 and advancing the stepper switch to terminal 15.

The negative voltage from wiper arm A—P is applied from terminals 15 through 19 through contacts KP–4 and closed contacts KF–5 to perforator clutch coil 136 while the price information from the long tag price field is applied to punch selector magnet coils. At position 20 the negative voltage from wiper arm A—P is not applied to the add solenoid because inventory switch terminals 186 are opened and operation is advanced due to the negative voltage on the stepper switch contact associated with wiper arm A–4 which energizes punch selector magnet coil LP–3.

The negative voltage on wiper arm A—P is applied from positions 21 through 25 through KF–5 to clutch coil 136 and wiper arm A–4 is energized in position 26. Also at position 26, the terminal associated with wiper arm A–1 is energized through closed switch KF–8, price switch 84, KT–1 and KE–2 if a short tag is read. Operation from position 27 to position 45 is the same as with regular tag sale operation. At position 46 where the verify light is normally illuminated and stepper switch operation stopped, the negative voltage from wiper arm A—P is applied through diode 222, inventory switch terminals 224 and closed contacts KF–5 to the perforator clutch coil 136 thereby allowing the complete cycle of operation to be automatic with the only manual operation required being that of inserting the tag in the tag reader.

The tag clutch coil is energized from the negative power supply terminal associated with inventory switch 210 through contacts SN which close at the end of each cycle of operation of the stepper switch and KT–3. Diode 230 blocks current flow from the negative terminal on inventory switch 210 so that the tag clutch coil is not energized until contacts SN close.

SUMMARY

There has been described a complete system utilizing equipment located at the point of sale for recording on a management control record, which in the illustrated embodiment is perforated tape, all of the information included on a merchandise tag plus clerk identification and type of transaction information and at the same time provides a printed receipt including only the information that is customarily provided on the customer's receipt. The equipment normally requires fewer operations by the clerk than are required by ordinary cash registering operations as the inventory control and price information are both recorded automatically.

The system is adequately flexible so that different prices can be recorded without preparing a separate merchandise tag each time a price change is put into effect. The system is adapted to use either of two types of merchandise tags interchangeably and one tag type may be converted to the other. By selective controls on the keyboard, the sales clerk is able to prevent the price information on either type of merchandise tag from being recorded either on the sales receipt or in the management control record and can manually enter the price to be charged on the keyboard and still use the remaining information on the tag. The manually entered price information is recorded on both the customer's receipt and the management control record with the later record being appropriately marked to indicate the exact operation of the various controls by the sales clerk.

A record of the sales tax and excise tax can be provided on the customer's receipt and also on the management control records thus producing an accurate record of the exact tax collected for the appropriate governmental agencies. Other transactions unaccompanied by tags such as "pay out" and "sales" can equally well be recorded by the present equipment.

The equipment is adequately flexible so that if only the information on the merchandise tag is required such as in the above described inventory operation, the tag reader and tape perforator can be used alone without the necessity of acquiring the keyboard and cash drawer combination. Similarly, if merchandising tags are not used, the point of sale equipment will merely require the keyboard and perforator units and will not require the tag reader.

The system according to the present invention requires only a single cashdrawer and the clerk number provides unique identification for cash balancing. The central data processing group can furnish reports based on the cash taken in by each clerk if desired. The perforated tape cannot be altered by a clerk and this provides an absolute cash balance check.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination: a recording mechanism operative to record information on a continuous storage medium in repeated blocks with each block containing a predetermined number of information units; clutch means operative to intermittently advance said storage member with respect to said recording mechanism; a scanning device having a plurality of input terminals and output terminals with each of said output terminals being arranged to be sequentially connected to predetermined groups of said input terminals; means supplying the information to be recorded to said input terminals; means connecting said output terminals to control operation of said recording mechanism; first switch means responsive to the operation of said recording mechanism for energizing said clutch means; a second means controlled by said scanning device for independently energizing said clutch means at predetermined positions in said block where no information is recorded, and a third means for independently energizing said clutch means comprising a circuit completed at an intermediate recording position in said block of information units and optionally energized during preselected positions of said scanning device subsequent to said intermediate recording position.

2. In combination: a recording mechanism for recording data on a storage medium in repeated patterns with each pattern containing a predetermined number of elements of data; a stepper switch having a plurality of banks of contacts; a wiper arm and a plurality of input terminals associated with each of said banks; programming circuit means connected to the terminals of one of said banks; means supplying data to be recorded to the terminals of another of said banks; means connecting said wiper arms associated with said last mentioned bank to control operation of said recording mechanism; and means responsive to the operation of said recording mechanism for effecting advancement of said wiper arms.

3. The combination as defined in claim 2 having additional means controlled by said programming circuit for advancing said wiper arms at positions where no data is recorded by said recording mechanism.

4. For use with a plurality of merchandise identification tags of different types having price information stored at different positions on the different types of tags, a tag reading mechanism adapted to read price information at different positions from each type of tag; a manually operable keyboard; a printing mechanism controlled by said tag reading mechanism and said keyboard operative to produce a printed record including price information during operation of the tag reading mechanism; means responsive to the type of tag in the tag reading mechanism for controlling the position in the tag reader from which price information printed by said printing mechanism is obtained; and means selectively operated for preventing price information from any position in said tag reader from being printed and for energizing the keyboard to receive price information to be printed by said printing mechanism.

5. In combination: a plurality of electromagnetic coils; recording mechanism controlled by selective energization of said electromagnetic coils; a plurality of solenoids; separate electrical key contacts connected to each solenoid and held closed while the solenoid is energized; circuit means for energizing said solenoids including a first normally closed switch means; electrical conductors connected from said contacts through a second normally closed switch means to said electromagnetic coils; and means responsive to energization of said electromagnetic coils for momentarily opening both of said switch means.

6. The combination as defined in claim 5 further including circuit means for holding said switch means open until all closed key contacts open.

7. In combination: a recording mechanism adapted to operate in a step by step manner having electromagnetic coils responsive to information to be recorded; a plurality of solenoids; a pair of key contact sets associated with each of said solenoids and arranged to close upon energization of the associated solenoid; first circuit means for energizing said solenoids through a first switch means and holding said solenoid energized through one of said key contact sets associated with the energized solenoid; second circuit means connected from the other of said key contacts through second switch means to said electromagnetic coils; a sequence scanner connected to selectively energize said solenoids to cause said key contacts to close in accordance with the different items of information supplied through said scanner; means responsive to the energization of said electromagnetic coils from said key contacts for advancing the record in said recording mechanism and opening said second switch means; and means controlled by operation of said recording mechanism for causing advancement of said sequence scanning means.

8. The combination as defined in claim 7 further having circuit means for holding said second switch means open until all closed key contacts open.

9. For use in a business control system, a mechanism for producing during a cycle of operation a management control record containing a field for recording the type of operation of the system, a price information field and an item identification information field comprising: a sequence scanner; a first control circuit associated with said scanner for supplying to said mechanism information identifying one type of operation unless another type of operation of the system is indicated; a second control circuit associated with said scanner for supplying price information to said price field; a third control circuit associated with said scanner through which item identification is supplied to said item field and a fourth control circuit associated with said scanner effective to cause said sequence scanner and said mechanism to stop after said information has been recorded and prior to the end of the cycle of operation until a manual operation verifying the correctness of the record is entered in the system.

10. A business control system as defined in claim 9 further having a plurality of means for supplying price information; control means for selectively conditioning only one of said means for supplying price information during a single operation for connection to said mechanism by said second control circuit; and a fifth control circuit associated with said scanner for identifying on said record the means from which price information is supplied.

11. The invention as defined in claim 9 further having means for synchronizing movement of the management control record and advancement of said sequence scanner.

12. The invention as defined in claim 9 further having a fifth control circuit associated with said scanner effective when energized to cause said sequence scanner to complete its cycle of operation without recording additional information in any of said fields, and means for selectively energizing said fifth control circuit.

13. In a business control system: a sequence scanner having a cycle of operation containing a first predetermined number of positions; a recording mechanism for producing a record of the business transaction in an information field having a cycle of operation containing a second predetermined number of positions less than said first predetermined number; first circuit means associated with the scanner for stopping the recording mechanism at the end of its cycle of operation, for causing the scanner to continue to the end of its cycle of operation before stopping and for causing both said mechanism and said scanner to begin their cycle of operation simultaneously upon receipt of predetermined information; switching means for substituting a second circuit for said first circuit to cause said recording mechanism and said scanner to each stop at positions beyond their respective stopping positions when said first circuit means is in operation whereby the information field in said record contains a constant number of positions even though said predetermined information is not supplied.

14. In a business control system utilizing merchandise information tags: a tag reader; a recorder; a recording sequence control means connected between said tag reader and said recorder to cause said recorder to operate in a cyclical manner and to stop the recording operation at a position in the cycle of operation after all information has been recorded; a first optional control means affirming the information recorded during said cycle to energize the sequence control means to complete the cycle of operation and eject the tag from said tag reader; and a second optional control means for disaffirming the recorded information to energize the sequence control means to initiate the starting of a new cycle of operation without ejecting said tag.

15. In combination: a manually operable keyboard including a printing mechanism producing a customer's receipt controlled by said keyboard; a recorder mechanism; a sequence control means connected with said keyboard and said recorder mechanism to effect cyclic operation of said recorder mechanism; means programming said sequence control means to stop at a position in said cycle of operation after all information has been recorded on said customer's receipt; first control means verifying the correctness of the printed information to energize said sequence control means to complete the cycle of operation; and second control means for indicating incorrect entry producing a special error marking on the incorrect record in said recorder mechanism and energizing said sequence control means to advance automatically to the beginning of said cycle of operation.

16. In a business control system utilizing two merchandise tag types each having price information stored in a coded pattern in different positions on the different tag types: a tag reading mechanism adapted to read information stored on both the tag types and arranged to receive both tag types in the same position whereby the price information is read by said tag reading mechanism at one position for one tag and at an alternate position for the other tag; a recording mechanism for producing a record containing said price information; circuit means connected to said recording mechanism for transferring price information supplied by said tag reading mechanism from either of said different positions; and means responsive to the type of tag inserted in the tag reading mechanism for selecting the position from which said price information is transferred from said tag reading mechanism to control said recording mechanism and blocking transfer of information from the unselected position to the recording mechanism.

References Cited in the file of this patent

UNITED STATES PATENTS

| | | |
|---|---|---|
| 1,962,750 | Read | June 12, 1934 |
| 1,978,931 | Bryce | Oct. 30, 1934 |
| 2,010,642 | Peirce | Aug. 6, 1935 |
| 2,016,686 | Knutson | Oct. 8, 1935 |
| 2,018,420 | Robinson et al. | Oct. 22, 1935 |
| 2,030,432 | Dickinson | Feb. 11, 1936 |
| 2,214,029 | Mixer | Sept. 10, 1940 |
| 2,346,268 | Mills et al. | Apr. 11, 1944 |
| 2,355,389 | Mills et al. | Aug. 8, 1944 |
| 2,394,604 | Ford | Feb. 12, 1946 |
| 2,412,537 | Roggenstein | Dec. 10, 1946 |
| 2,434,500 | Leathers et al. | Jan. 13, 1948 |
| 2,540,029 | Hamilton et al. | Jan. 30, 1951 |
| 2,615,629 | Dayger | Oct. 28, 1952 |
| 2,647,581 | Gardinor et al. | Aug. 4, 1953 |
| 2,647,689 | Bowyer et al. | Aug. 4, 1953 |
| 2,717,733 | Luhn et al. | Sept. 23, 1955 |
| 2,746,679 | Stratton et al. | May 22, 1956 |
| 2,812,902 | Runde et al. | Nov. 12, 1957 |
| 2,864,554 | Rolph et al. | Dec. 16, 1958 |
| 2,878,872 | Burns et al. | Mar. 24, 1959 |

FOREIGN PATENTS

| | | |
|---|---|---|
| 913,366 | Germany | June 10, 1954 |